(12) United States Patent
Shilmover

(10) Patent No.: US 12,417,085 B2
(45) Date of Patent: Sep. 16, 2025

(54) OBTAINING DEPLOYMENT TOKENS FOR DEPLOYING ARTIFACTS TO A CLOUD ENVIRONMENT

(71) Applicant: Oracle International Corporation, Redwood Shores, CA (US)

(72) Inventor: Barry Shilmover, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/647,838

(22) Filed: Apr. 26, 2024

(65) Prior Publication Data

US 2024/0364588 A1    Oct. 31, 2024

Related U.S. Application Data

(60) Provisional application No. 63/462,875, filed on Apr. 28, 2023.

(51) Int. Cl.
*G06F 8/60* (2018.01)
*G06F 9/50* (2006.01)
(Continued)

(52) U.S. Cl.
CPC .............. *G06F 8/60* (2013.01); *G06F 9/5005* (2013.01); *H04L 9/3213* (2013.01);
(Continued)

(58) Field of Classification Search
None
See application file for complete search history.

(56) References Cited

U.S. PATENT DOCUMENTS 9,438,599 B1    9/2016  Yuhan et al.
10,649,834 B2*  5/2020  Dhayapule .......... G06F 11/0709
(Continued)

FOREIGN PATENT DOCUMENTS

EP    3429156 A1    1/2019
EP    3271857 B1    4/2020
WO    2021/150306 A1    7/2021

OTHER PUBLICATIONS

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.
(Continued)

*Primary Examiner* — Quang N Nguyen
(74) *Attorney, Agent, or Firm* — Invoke

(57) ABSTRACT

Techniques for deploying artifacts to a computing environment are disclosed. A system includes a deployment service for routing requests to destination addresses in a target computing environment. The deployment service detects a request from an artifact deployment tool to deploy an artifact to the target computing environment. The deployment service obtains a deployment token representing verification that a set of one or more customer designated conditions are satisfied to deploy the artifact to the target computing environment. The deployment service obtains validation of the deployment token. Responsive to successfully obtaining validation of the deployment token, the deployment service directs the artifact to a destination address in the target computing environment. The artifact is received at the destination address and deployed in the target computing environment.

20 Claims, 26 Drawing Sheets

(51) Int. Cl.
*H04L 9/32* (2006.01)
*H04L 9/40* (2022.01)
*H04L 41/0806* (2022.01)
*H04L 41/0869* (2022.01)
*H04L 67/10* (2022.01)
*G06Q 30/015* (2023.01)

(52) U.S. Cl.
CPC ...... *H04L 41/0806* (2013.01); *H04L 41/0869* (2013.01); *H04L 63/108* (2013.01); *H04L 67/10* (2013.01); *G06Q 30/015* (2023.01)

(56) References Cited

U.S. PATENT DOCUMENTS

| | | |
|---|---|---|
| 10,878,483 B1 | 12/2020 | Felbinger et al. |
| 11,356,273 B1 | 6/2022 | Patel et al. |
| 2006/0230281 A1 | 10/2006 | Hofmann |
| 2007/0179859 A1 | 8/2007 | Chan et al. |
| 2013/0054426 A1 | 2/2013 | Rowland et al. |
| 2015/0363852 A1 | 12/2015 | Vautour |
| 2016/0043909 A1 | 2/2016 | Pogrebinsky et al. |
| 2016/0080479 A1* | 3/2016 | Zhang ............... H04L 67/10 709/217 |
| 2016/0277411 A1 | 9/2016 | Dani et al. |
| 2017/0230229 A1 | 8/2017 | Sasturkar et al. |
| 2018/0173510 A1* | 6/2018 | Koshkin .......... G06Q 10/06313 |
| 2018/0288063 A1 | 10/2018 | Koottayi et al. |
| 2018/0367542 A1 | 12/2018 | Wolf et al. |
| 2019/0087835 A1 | 3/2019 | Schwed et al. |
| 2019/0155674 A1* | 5/2019 | Dhayapule ............ G06F 11/079 |
| 2020/0112497 A1 | 4/2020 | Yenumulapalli et al. |
| 2020/0285737 A1 | 9/2020 | Kraus et al. |
| 2020/0358617 A1* | 11/2020 | Baierlein ............... H04L 9/3228 |
| 2021/0216190 A1 | 7/2021 | Vakil et al. |
| 2021/0234864 A1 | 7/2021 | Dube et al. |
| 2021/0377272 A1 | 12/2021 | Dasari et al. |
| 2022/0255902 A1 | 8/2022 | Woodson |
| 2024/0054063 A1 | 2/2024 | Wichelman et al. |
| 2024/0095739 A1 | 3/2024 | Adogla et al. |
| 2024/0259389 A1 | 8/2024 | Wu et al. |

OTHER PUBLICATIONS

"General Variables for All Requests", Jun. 28, 2023, pp. 6.
"Overview of Access Approval", Retrieved from https://cloud.google.com/assured-workloads/access-approval/docs/overview, Jun. 6, 2024, pp. 5.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
"Verbs", Jun. 5, 2023, pp. 2.
Anonymbus: "Tokenization—(data security)", Wikipedia, Feb. 12, 2023, pp. 1-12.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.

\* cited by examiner

| Data Corpus 1200 | | | | | |
|---|---|---|---|---|---|
| Target Computing Environment 1204 | Address 1206 | Deployment Token Required? 1208 | Artifact Type 1210 | Verifications 1212 | Status 1214 |
| Resource A | Address A | Yes | All | Customer Approval | Met |
| | | | | Deployment State | Met |
| | | | | Change Ticket Status | Met |
| Resource B | Address B | Yes | Type B | Customer Approval | Met |
| | | | | Deployment State | Met |
| Resource C | Address C | Yes | Type C | Customer Approval | Met |
| | | | | Deployment State | Unmet |
| Resource D | Address D | Yes | All | Customer Approval | Unmet |
| | | | | Deployment State | Unmet |
| Resource E | Address E | No | | | |
| ⋮ | | | | | |
| Resource N | Address N | Yes | All | Verification 1 | Met |
| | | | | Verification 2 | Met |

*FIGURE 12*

OBTAINING DEPLOYMENT TOKENS FOR DEPLOYING ARTIFACTS TO A CLOUD ENVIRONMENT

BENEFIT CLAIMS; RELATED APPLICATIONS; INCORPORATION BY REFERENCE

This application claims the benefit of U.S. Provisional Patent Application Ser. No. 63/462,875, filed Apr. 28, 2023, that is hereby incorporated by reference.

U.S. patent application Ser. No. 18/647,781, titled "Consent-Driven Access Management For Cloud Resources" filed Apr. 26, 2024, is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloud computing environments. More particularly, the present disclosure relates to systems and methods for deploying artifacts to a cloud environment.

BACKGROUND

A cloud computing environment can be used to provide access to a range of complementary cloud-based components, such as software applications or services, that enable organizations or enterprise customers to operate their applications and services in a highly available hosted environment. The benefits to an organization in moving their application and service needs to a cloud environment include reductions in the cost and complexity of designing, building, operating, and maintaining their own on-premise data center, software application framework, or other information technology infrastructure.

Organizations that utilize a cloud environment may utilize various techniques to deploy artifacts to the cloud environment. Artifacts that are deployed to a cloud environment include various elements for maintaining the operations, performance, and security of the cloud environment. These artifacts include elements such as updates, upgrades, patches, configuration changes, code, applications, and other elements that are utilized in the cloud environment. Artifacts are deployed to the cloud environment on a regular basis to keep the operations, performance, and security of the cloud environment up to date, for example, as business needs and/or technology changes over time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 12 illustrates an example data corpus that may be included in the system described with reference to FIGS. 11A and 11B in accordance with one or more embodiments.

DETAILED DESCRIPTION

Figure 1:
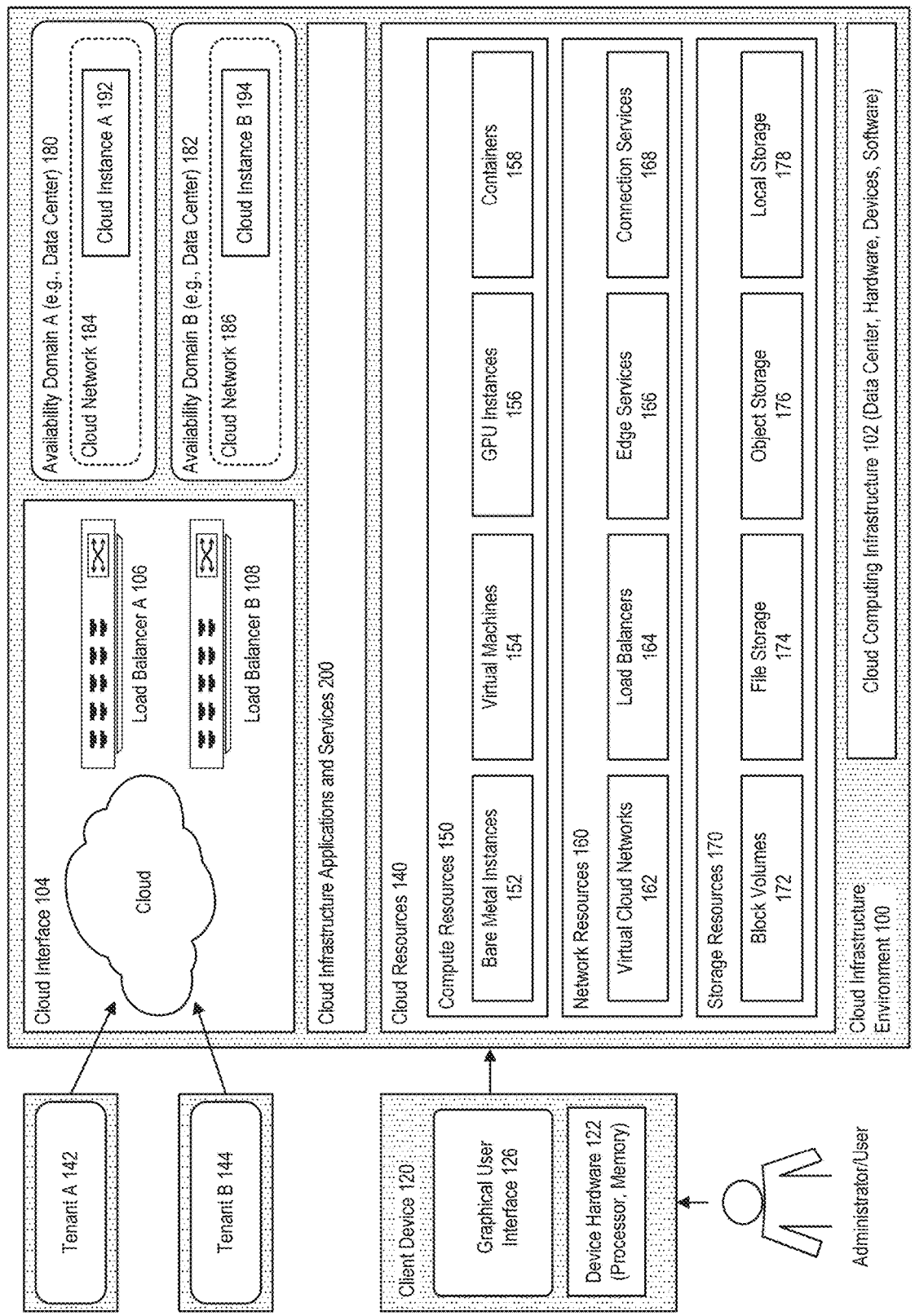
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.
1. GENERAL OVERVIEW
2. EXAMPLE CLOUD ENVIRONMENTS
3. SYSTEM ARCHITECTURE FOR DEPLOYING ARTIFACTS TO A CLOUD ENVIRONMENT
4. EXAMPLE OPERATIONS FOR DEPLOYING ARTIFACTS TO A CLOUD ENVIRONMENT
5. EXAMPLE EMBODIMENTS
6. MISCELLANEOUS; EXTENSIONS 1. General Overview One or more embodiments condition deployment of artifacts to a computing environment on verification that a set of one or more customer designated conditions are satisfied. A system obtains a deployment token that represents verification that the set of customer designated conditions for deploying an artifact to a target computing environment are satisfied. The deployment token is presented for validation in connection with a deployment request to deploy the artifact to the target computing environment. If the deployment token is successfully validated, the artifact may be deployed to the target computing environment. Alternatively, without a valid deployment token, the artifact is not deployed to the target computing environment.

Various customers may designate different conditions for deployment of artifacts to their computing environments. The conditions that a customer designates for deployment of artifacts to their computing environment may depend on particular concerns of the customer. The concerns of a customer may pertain to one or more of the following: security, regulatory compliance, performance, scalability, cost management, data sovereignty, reliability, availability, resource utilization, operating performance, internal policies, or business objectives. The customer designated conditions for a particular customer may correspond to one or more of these concerns. Additionally, or alternatively, the customer designated conditions may correspond to obligations specified in a service level agreement (SLA) for the customer. In one example, the customer is a private label cloud (PLC) operator that operates a cloud environment provided by a cloud infrastructure provider. The cloud infrastructure provider may deploy artifacts to the cloud environment, and the PLC operator or customer may designate conditions for deployment of artifacts to the cloud environment by the cloud infrastructure provider. The conditions designated by the PLC operator may correspond to one or more of the aforementioned concerns and/or to an SLA between the PLC operator and the cloud infrastructure provider. Additionally, or alternatively, the conditions designated by the PLC operator may correspond to concerns associated with cloud services that the PLC operator provides to its customers via the cloud environment. In one example, the conditions designated by the PLC operator may correspond to concerns associated with an SLA between the PLC operator and one or more customers of the PLC operator.

The deployment token represents verification that the conditions designated by a particular customer are satisfied prior to deploying the artifact. The customer designated conditions may include verification that approval to deploy the artifact has been obtained from the customer in accordance with an approval workflow defined by the customer. Additionally, or alternatively, the customer designated conditions may include verification that a set of one or more deployment states of the target computing environment designated by the customer are satisfied. The particular conditions designated by the customer may depend on the particular type of artifact to be deployed and/or on the particular target computing environment where the artifact is to be deployed.

In one example, to deploy an artifact to a target computing environment, an artifact deployment tool obtains a deployment token for the artifact, generates a deployment request, and directs the deployment request and the deployment token to a deployment service for deploying artifacts to the target computing environment. The deployment service obtains validation of the deployment token, and responsive to obtaining validation of the deployment token, the deployment service deploys the artifact to the target computing environment. The deployment token may be obtained by a verification service that is a component of the artifact deployment tool. Additionally, or alternatively, the artifact deployment tool may obtain the deployment token by directing a token request to a verification service that processes token requests from one or more artifact deployment tools.

In one example, a deployment service detects a request from an artifact deployment tool to deploy an artifact to a target computing environment, and responsive to detecting the request, the deployment service obtains a deployment token for the artifact. The deployment service obtains validation of the deployment token, and responsive to successfully obtaining validation of the deployment token, the deployment service directs the artifact to a destination address in the target computing environment. The artifact is received at the destination address and deployed in the target computing environment. The deployment token may be obtained by a verification service that is a component of the deployment service. Additionally, or alternatively, the deployment service may obtain the deployment token by directing a token request to a verification service that processes token requests from one or more deployment services.

The system may include one or more verification services, for example, to obtain deployment tokens associated with various sources of artifacts to be deployed to various target computing environments. In the various embodiments, the verification service verifies, based at least in part on the metadata pertaining to the artifact to be deployed, that the customer designated condition are satisfied. In response to successfully verifying that the customer designated condition are satisfied, the verification service provides the deployment token representing verification that the customer designated condition are satisfied. The deployment token may be generated by the verification service and/or the verification service may obtain the deployment token from another service, such as from an identity and access management service (IAM), that is configured to generate deployment tokens.

In various embodiments, the system conditions deployment of artifacts on the successful validation of a deployment token corresponding to the artifact to be deployed. Additionally, or alternatively, the system refrains from deploying artifacts when a deployment token is not provided and/or when a deployment token is not successfully validated. By conditioning deployment of artifacts on the successful validation of a deployment token corresponding to the artifact, the system ensures that artifacts are not deployed unless the customer designated conditions for the deployment are satisfied. Further, the deployment token provides a mechanism for validating that the customer designated conditions for deploying an artifact have been satisfied prior to deploying the artifact. Accordingly, the system accommodates different sets of conditions designated by different customers for deploying artifacts to the respective computing environments corresponding to the different customers. Additionally, by allowing customers to designate the conditions for deploying artifacts and utilizing a deployment token to represent verification that the conditions are satisfied, the customers have assurance that the system is meeting the particular concerns of the customers.

One or more embodiments described in this Specification and/or recited in the claims may not be included in this General Overview section.

2. Example Cloud Environments

One or more embodiments provide features associated with cloud environments, including PLC environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment. The benefits to an organization in moving their application and service needs to a cloud infrastructure environment include a reduction in the cost and complexity of designing, building, operating, and maintaining their own on-premise data center, software application framework, or other information technology infrastructure. Organizations that utilize a cloud environment may utilize various operational tools to monitor the operations and performance of the cloud environment.

Cloud Infrastructure Environments

Figure 2:
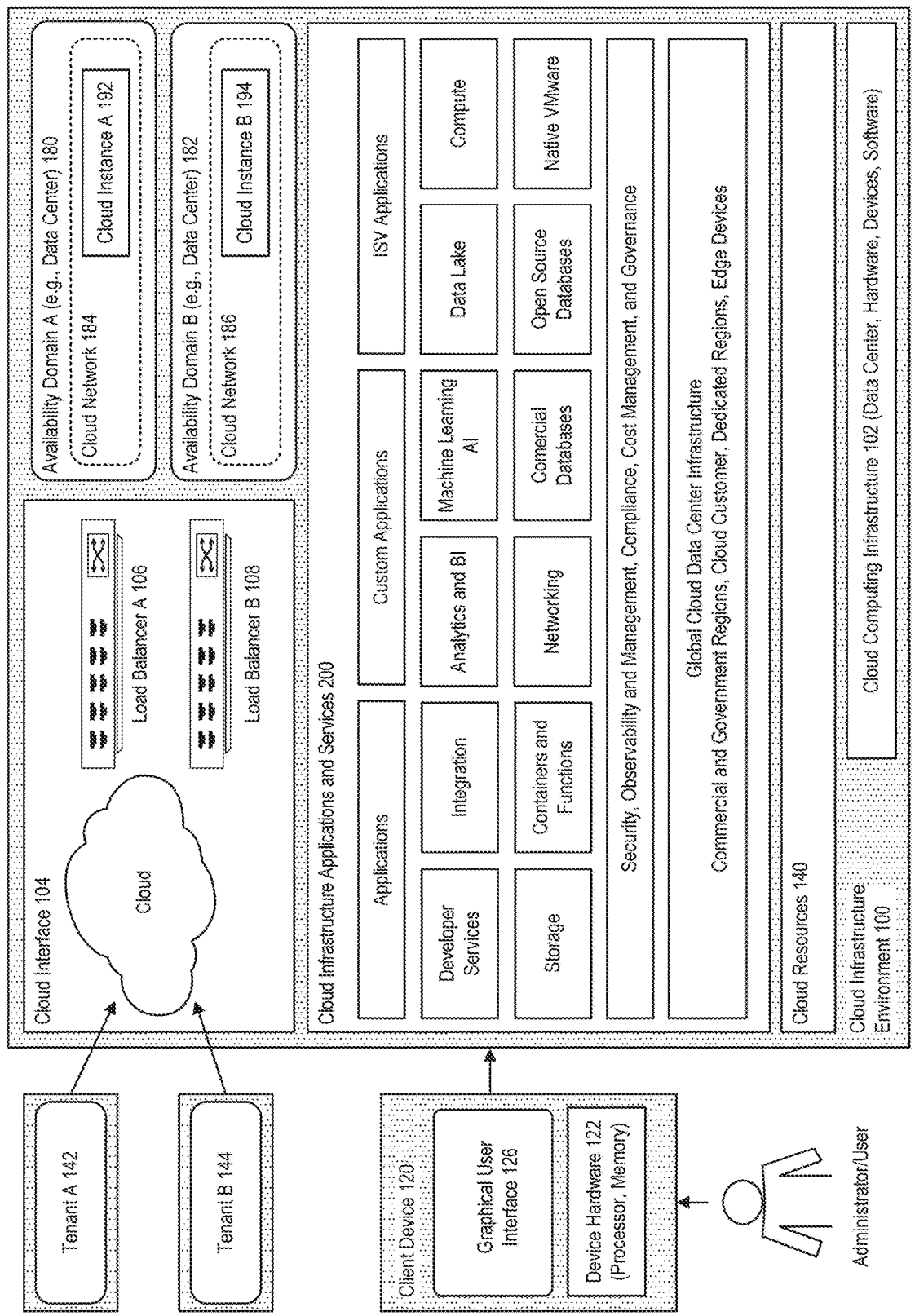
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. An Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/ outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
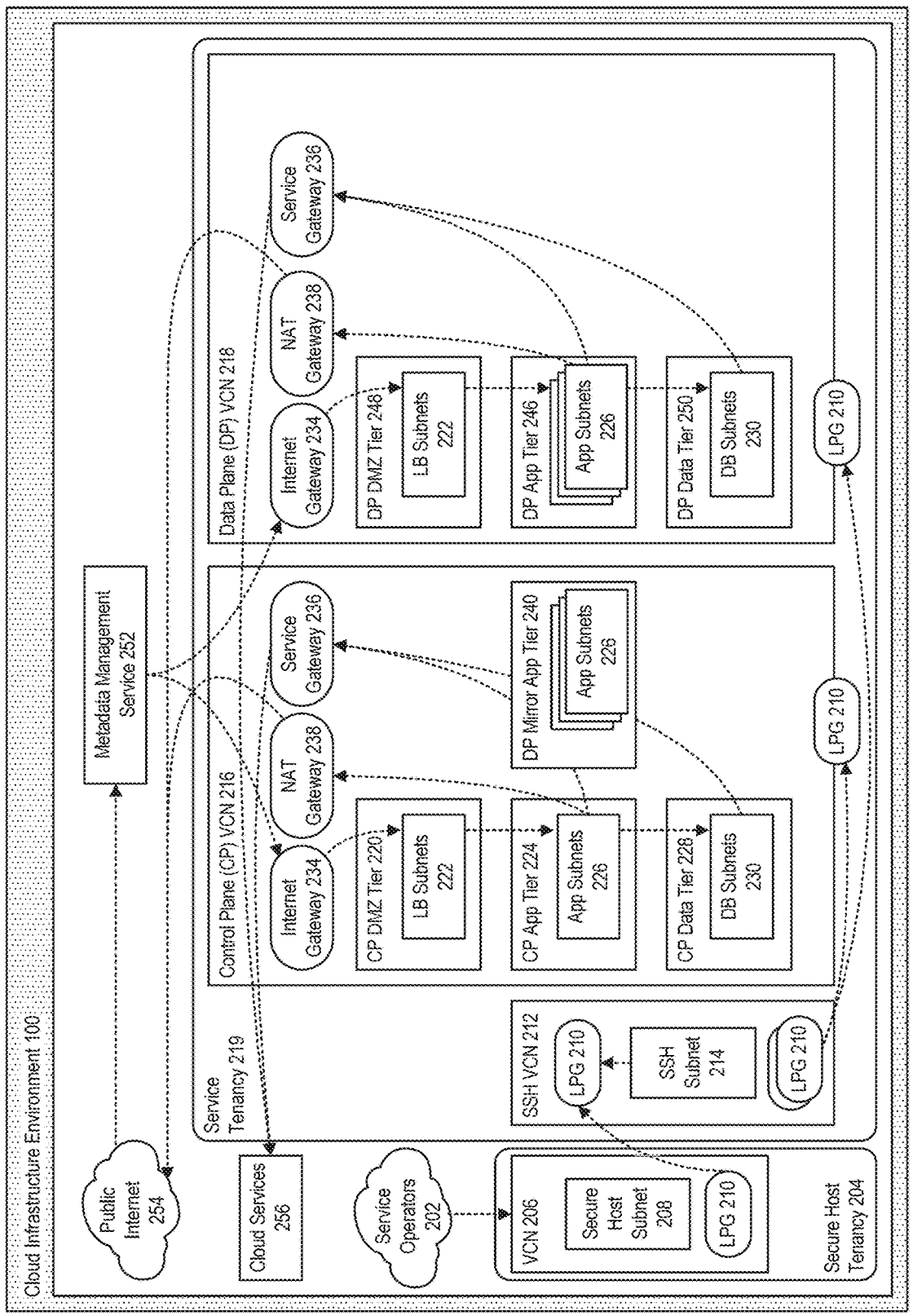
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
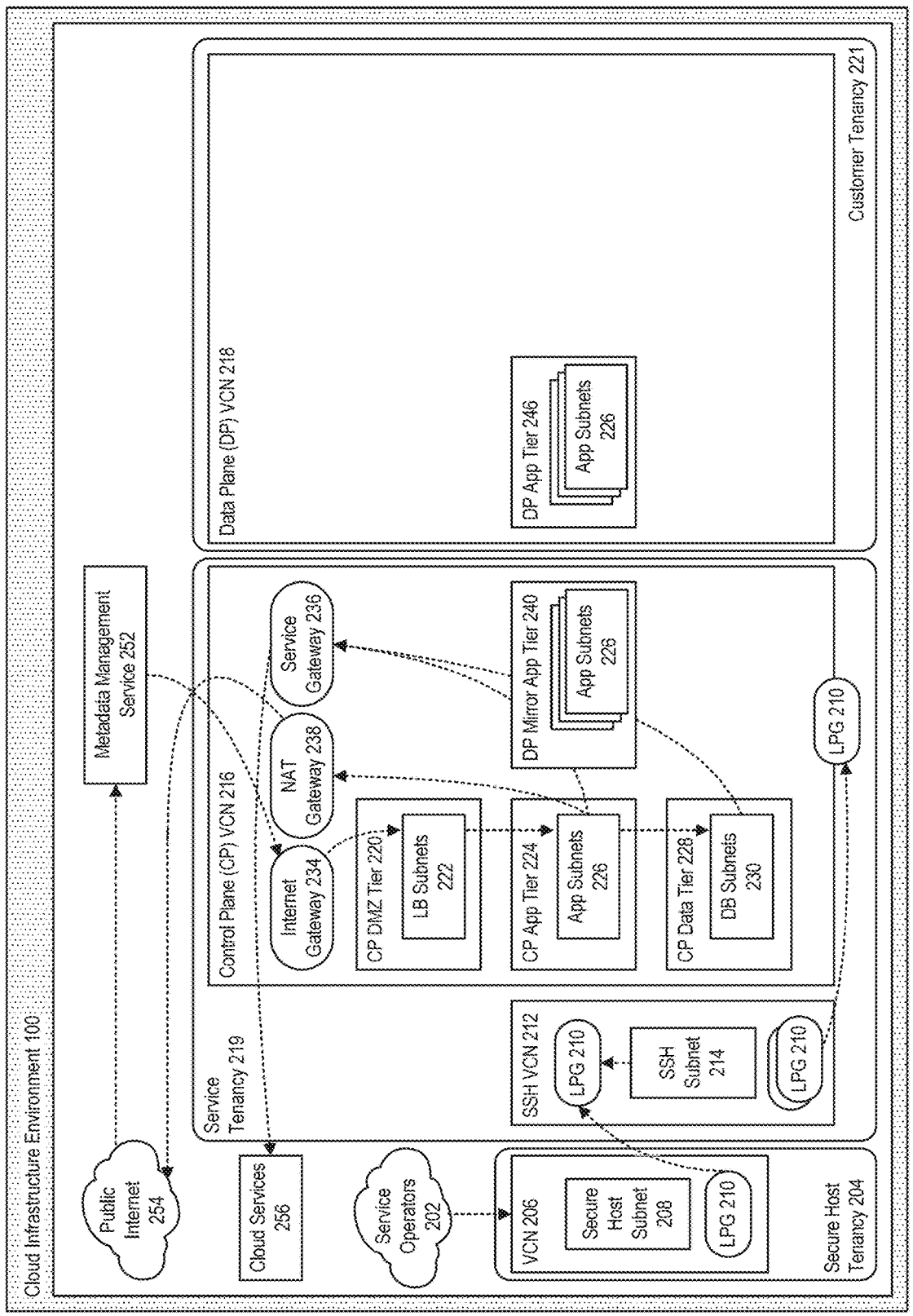
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
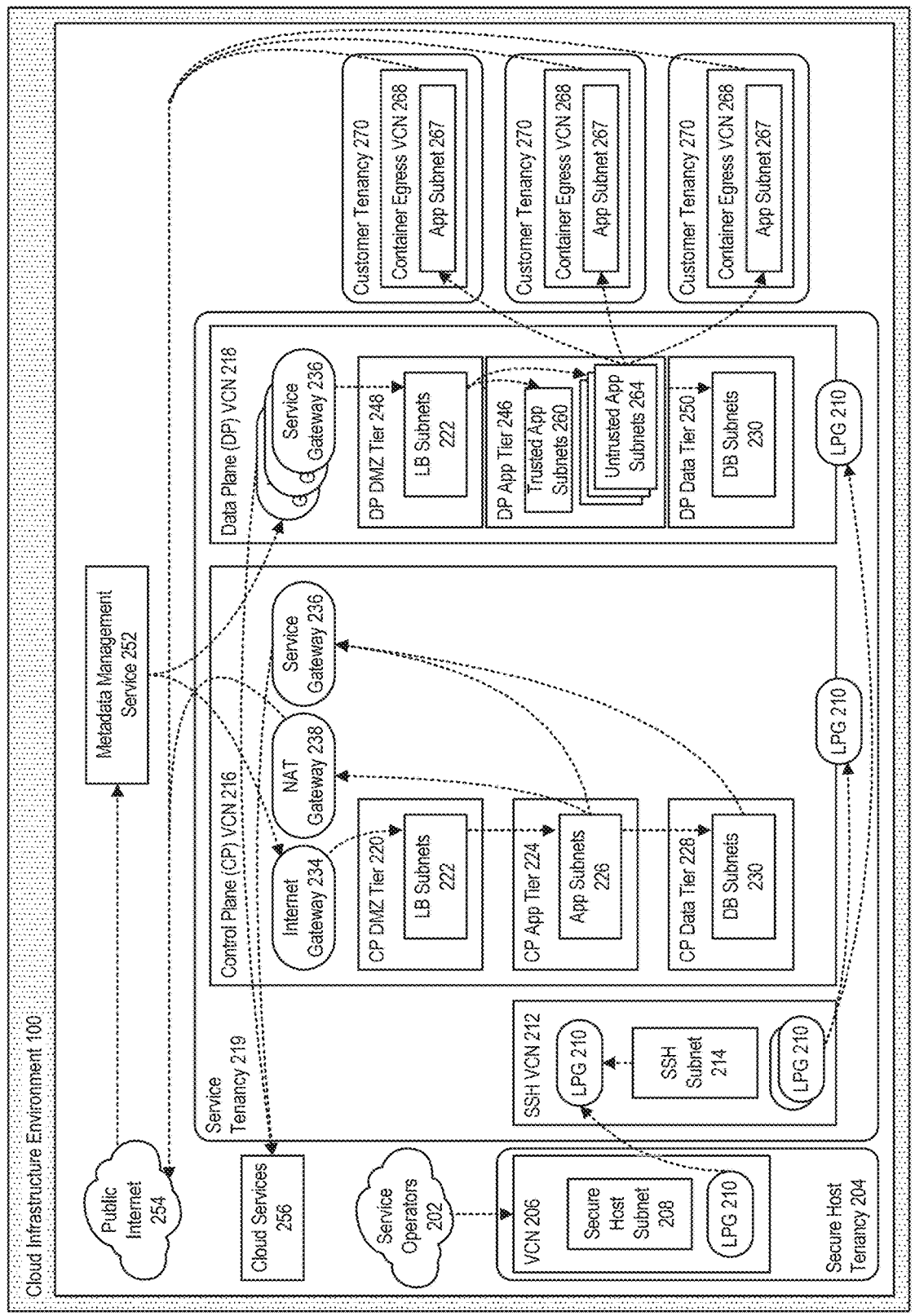
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN.

However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
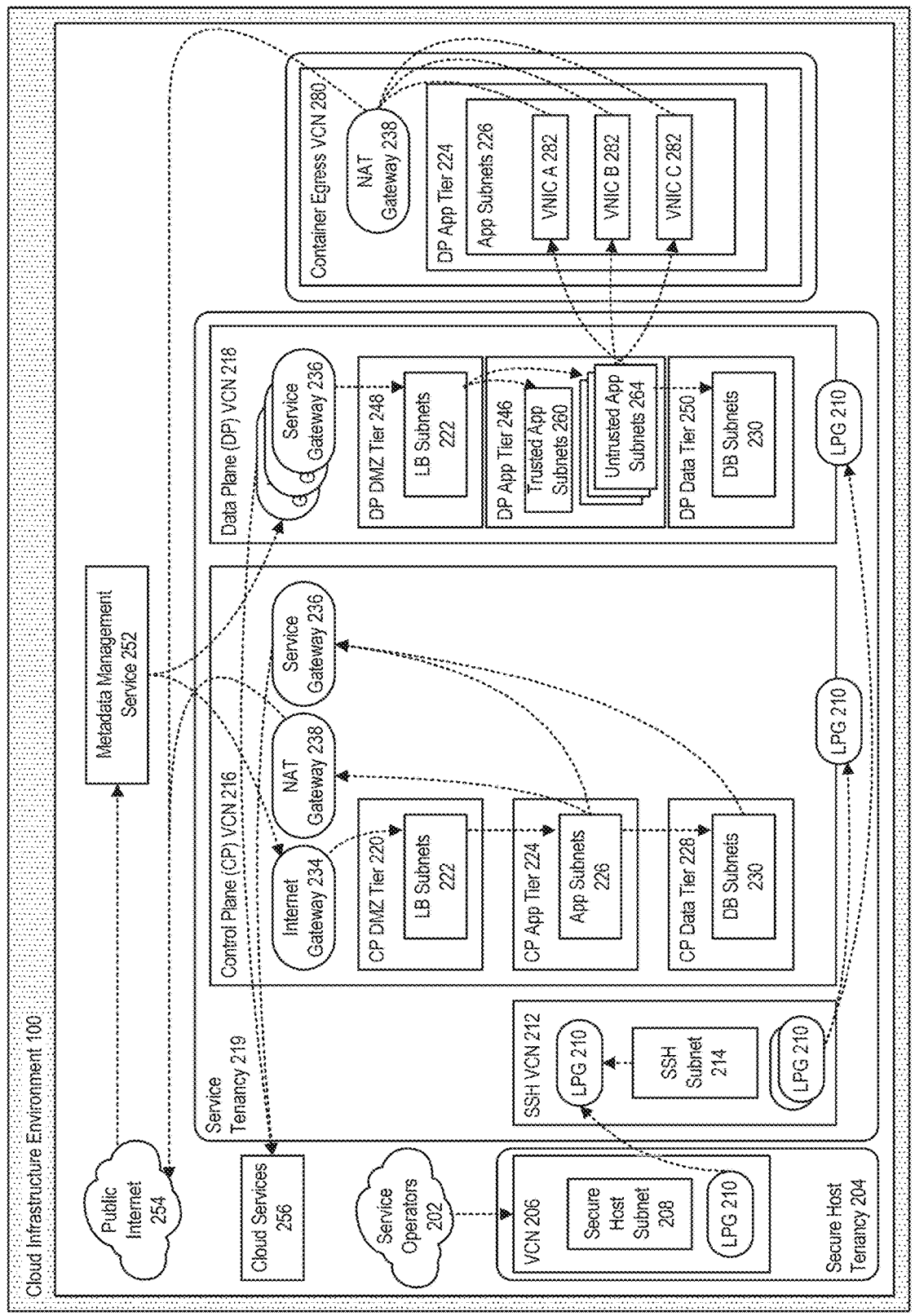
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
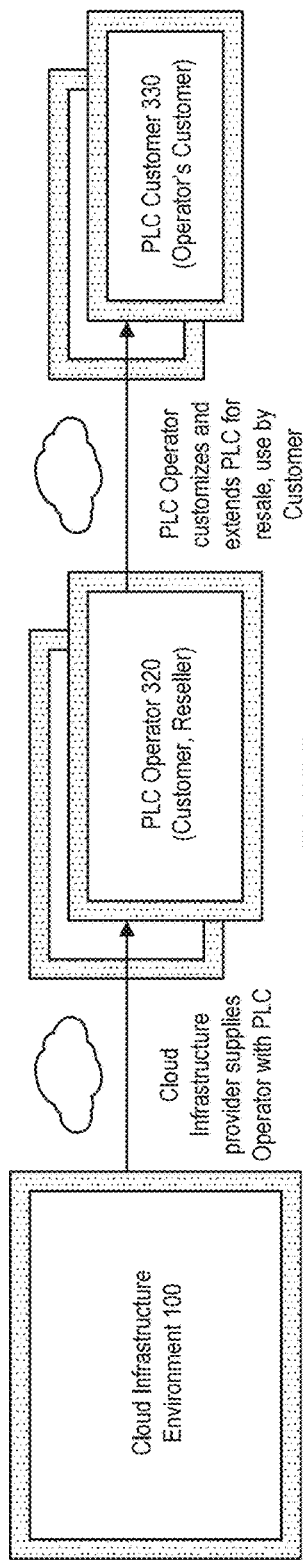
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
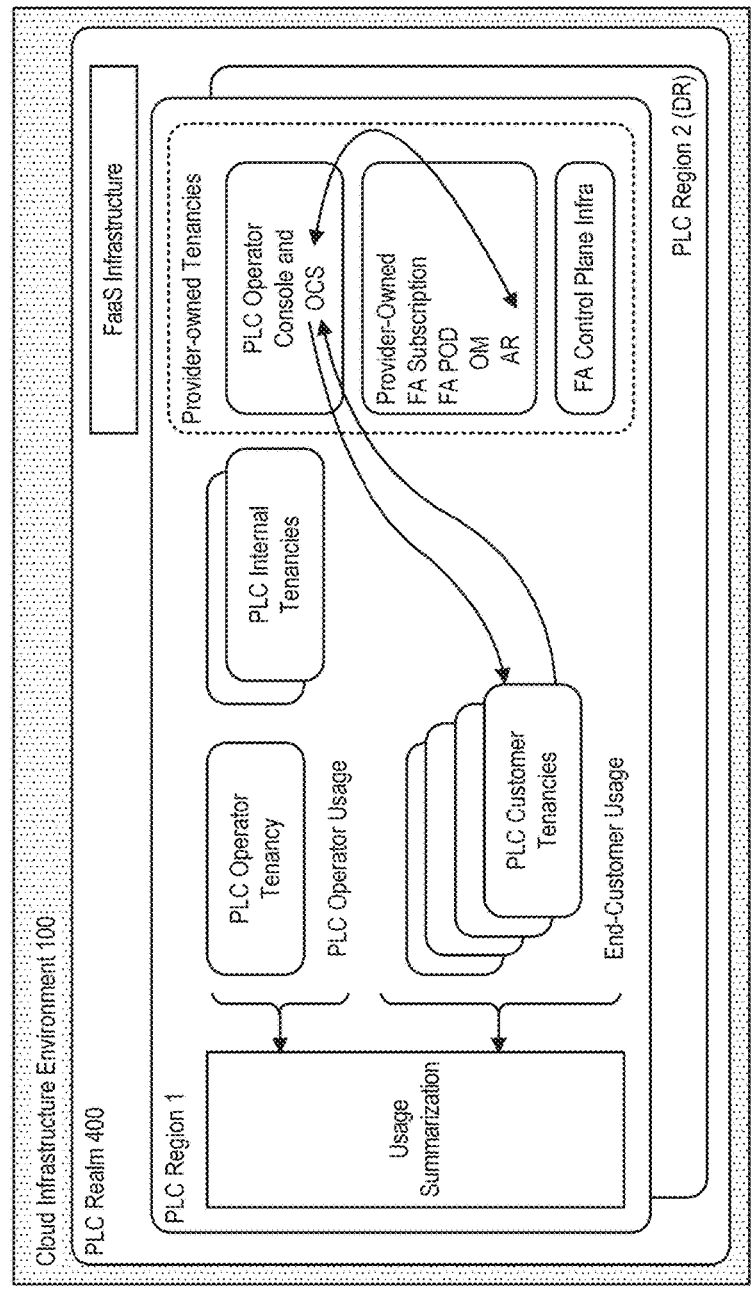
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
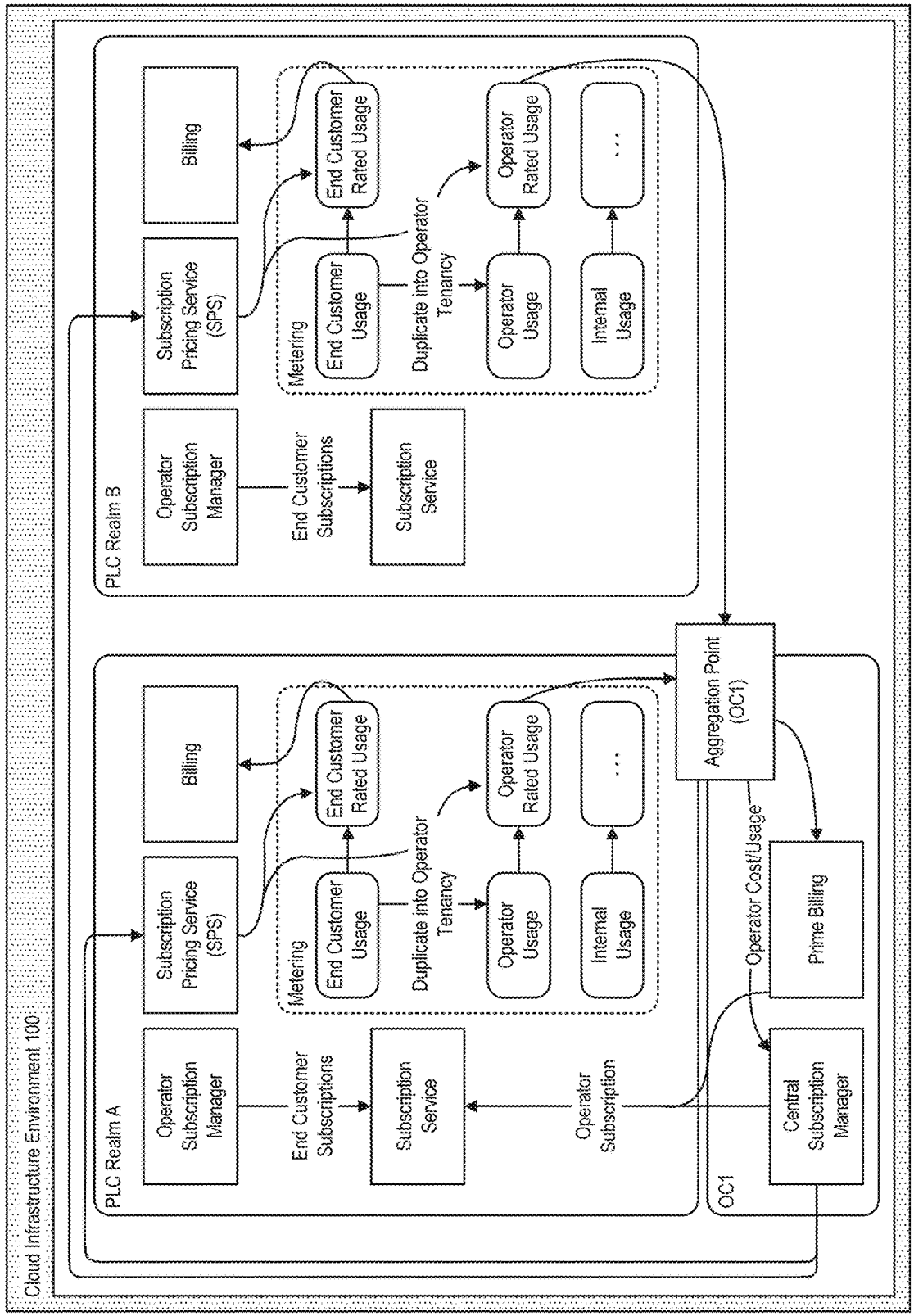
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
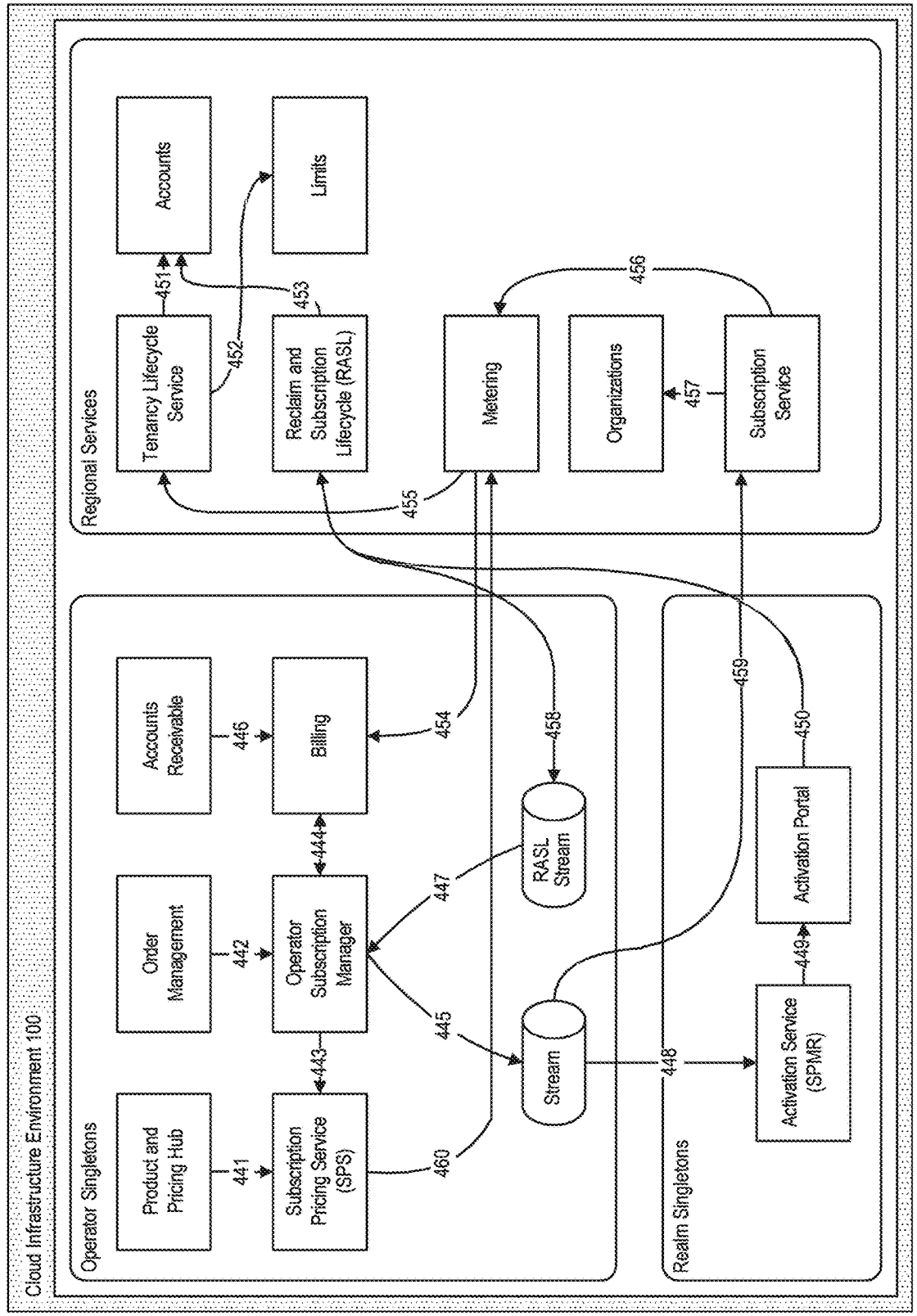
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can synchronize product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to a cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

3. System Architecture for Deploying Artifacts to a Cloud Environment

Figure 11A:
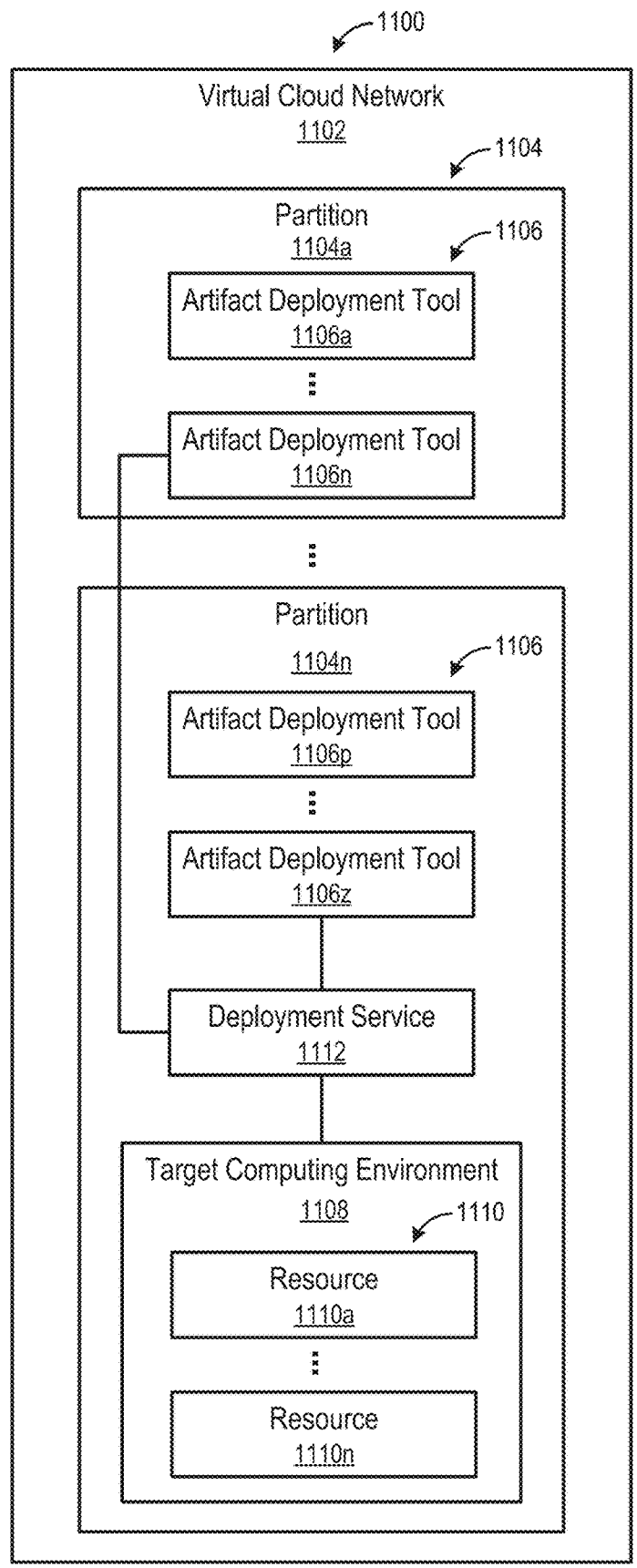
FIG. 11A illustrates an example system that includes features for deploying artifacts to a cloud environment in accordance with one or more embodiments.
Figure 11B:
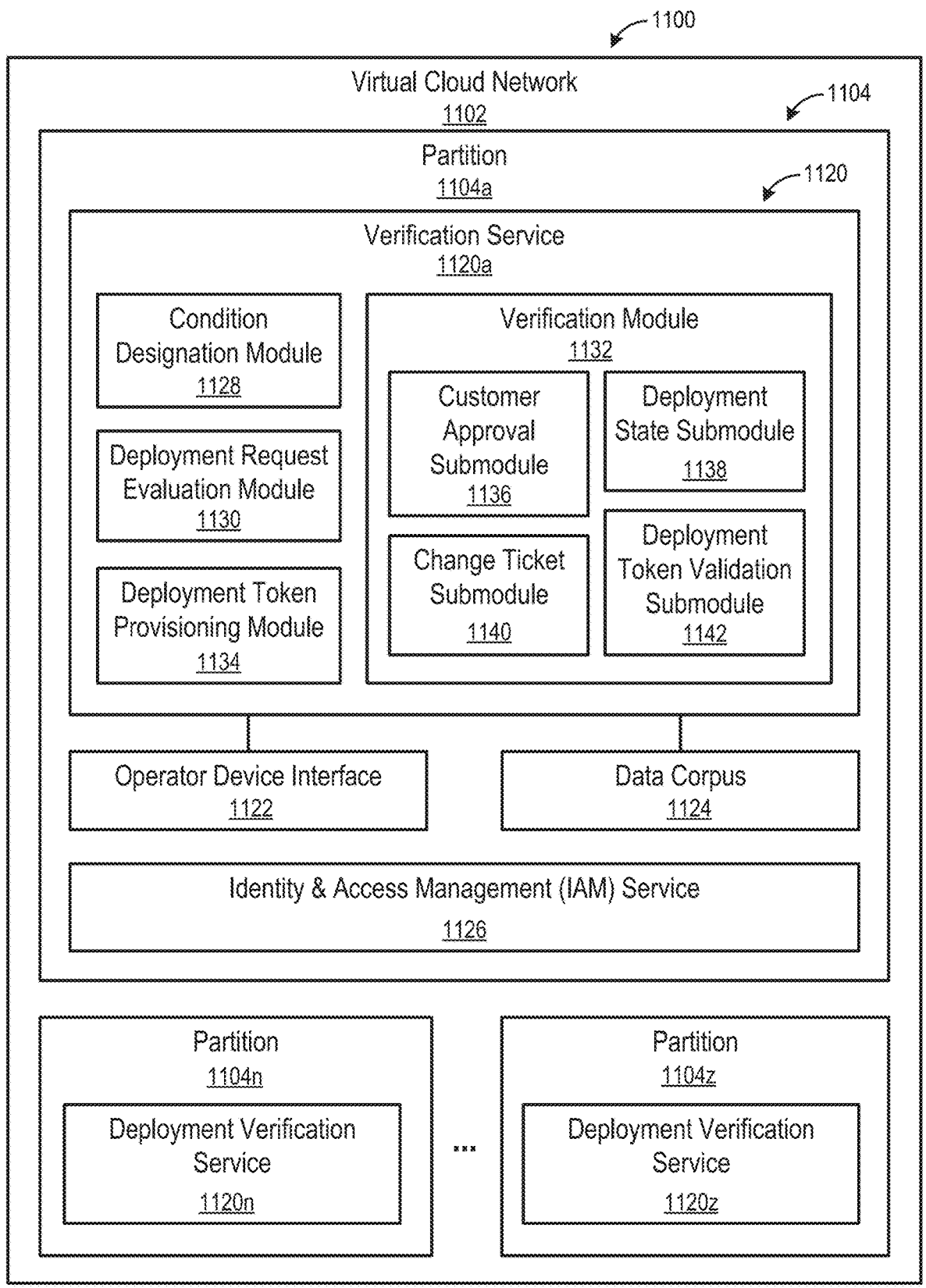
FIG. 11B illustrates further features of the example system of FIG. 11A, including features of a verification service for verifying conditions for deploying artifacts to a target computing environment and obtaining verification tokens representing verification that the conditions for deploying artifacts to the target computing environment are satisfied in accordance with one or more embodiments.

FIGS. 11A and 11B illustrate features of a system 1100. In accordance with one or more embodiments, the system 1100 includes features for conditioning deployment of artifacts to a computing environment on verification that a set of one or more customer designated conditions are satisfied. In one or more embodiments, the system 1100 refers to hardware and/or software configured to perform operations described herein. Examples of operations are described below with reference to FIGS. 13A and 13B. In addition to the features described with reference to FIGS. 11A and 11B, the system 1100 may include one or more features described above in Section 2, titled "Dedicated Or Private Label Cloud Environments."

In one or more embodiments, the system 1100 may include more or fewer components than the components described with reference to FIGS. 11A and 11B. The components described with reference to FIGS. 11A and 11B may be local to or remote from each other. The components described with reference to FIGS. 11A and 11B may be implemented in software and/or hardware. The components of system 1100 may be distributed over multiple applications and/or machines. Multiple components may be combined into one application and/or machine. Operations described with respect to one component may instead be performed by another component.

A. Example Artifact Deployment Architecture

Referring to FIG. 11A, the system 1100 includes a virtual cloud network 1102 with a set of partitions 1104 deployed in the virtual cloud network 1102. One or more of the partitions 1104 may be allocated to a PLC operator or customer. Additionally, or alternatively, one or more of the partitions may be allocated to a cloud infrastructure provider. In one example, partition 1104a is allocated to a cloud infrastructure provider and partition 1104n is allocated to a PLC operator or customer. The partitions 1104 represent logically or physically isolated portions of the virtual cloud network 1102. In one example, the partitions include realms, such as PLC realms, that isolate portions of the virtual cloud network 1102 as between different entities, such as different PLC operators or customers. Additionally, or alternatively, the partitions 1104 may include tenant partitions, or tenancies, that isolate portions of the virtual cloud network 1102 as between different entities, or tenants, such as PLC operators or customers. Additionally, or alternatively, the partitions 1104 may include one or more of the following: service partitions that isolate different services or workloads; geographic partitions that isolate a portion of the virtual cloud network 1102 corresponding to a particular geographic region; or network partitions that isolate the virtual cloud network 1102 into separate segments or subnets.

As shown in FIG. 11A, one or more of the partitions 1104 respectively include one or more artifact deployment tools 1106 for deploying artifacts to a target computing environment 1108. In one example, as shown in FIG. 11A, partition 1104a includes artifact deployment tool 1106a and artifact deployment tool 1106n, and partition 1104n includes artifact deployment tool 1106p and artifact deployment tool 1106z. An artifact deployment tool 1106 may deploy an artifact to a target computing environment 1108 that is located in the same partition 1104 and/or in a different partition 1104 as the artifact deployment tool 1106. A partition 1104 may include one or more target computing environments 1108. In one example, partition 1104n includes a target computing environment 1108. A target computing environment 1108 may include one or more resources 1110. In one example, as shown in FIG. 11A, partition 1104n includes resource 1110a and resource 1110n. An artifact deployment tool 1106 may deploy one or more artifacts to one or more target computing environments 1108. Additionally, or alternatively, an artifact deployment tool 1106 may deploy one or more artifacts to one or more resources 1110 of a target computing environment 1108. The one or more artifacts may be deployed to a particular resource 1110 of a target computing environment 1108, to a subset of resources 1110 of a target computing environment 1108, or to all resources 1110 of a target computing environment 1108. The target computing environment 1108 for deploying an artifact may include a set of one or more resources 1110 located in a particular partition 1104 of the virtual cloud network 1102. In one example, artifact deployment tool 1106a and/or artifact deployment tool 1106n located in partition 1104a may deploy artifacts to one or more resources 1110 located in partition 1104n. Additionally, or alternatively, artifact deployment tool 1106p and/or artifact deployment tool 1106z located in partition 1104n may deploy artifacts to one or more resources 1110 located in partition 1104n.

In one example, one or more partitions 1104 include a deployment service 1112 that directs artifacts to target computing environments 1108, such as to resources 1110, for deployment. The deployment service 1112 may direct artifacts to target computing environments 1108 for deployment in response to deployment requests from artifact deployment tools 1106. As shown in FIG. 11A, partition 1104n includes a deployment service 1112 that directs artifacts to resources 1110 located in partition 1104n. To deploy an artifact to a target computing environment 1108, such as to a resource 1110, an artifact deployment tool 1106 generates a deployment request and directs the deployment request to the deployment service 1112 and/or to a destination address in the target computing environment 1108. The deployment request may include a request from the artifact deployment tool 1106 to deploy an artifact to the target computing environment 1108. Additionally, or alternatively, the deployment request may include the artifact for deployment to the target computing environment 1108 and/or a network address where the artifact is located. In one example, the deployment request includes a deployment token representing verification that a set of one or more customer designated conditions are satisfied to deploy the artifact to the target computing environment 1108. Additionally, or alternatively, the artifact deployment tool 1106 may provide the deployment token corresponding to the artifact to the deployment service 1112 separately from the deployment request.

In one example, artifact deployment tool 1106 directs the deployment request to the deployment service 1112 and the deployment service 1112 receives the deployment request. Additionally, or alternatively, artifact deployment tool 1106 directs the deployment request to a destination address in the target computing environment 1108 and the deployment service 1112 intercepts the deployment request. In one example, the deployment service 1112 receives a deployment token that accompanies or is included in the deployment request. Additionally, or alternatively, the deployment service 1112 obtains the deployment token in response to receiving the deployment request. Upon successfully validating the deployment token corresponding to the deployment request, the deployment service 1112 directs the artifact to the destination address in the target computing environment 1108. The artifact is received at the destination address and deployed in the target computing environment 1108.

i. Example Artifacts

As used herein, the term "artifact" refers to a component or digital asset that is deployable in a computing environment. An artifact may include one or more of the following: code files, configuration files, databases, binaries, executables, libraries, documentation, images, templates, or scripts. Additionally, or alternatively, an artifact may include one or more of the following: a patch, an update, a service pack, a version upgrade, a firmware upgrade, a security update, a hotfix, a compatibility update, or a cumulative package. In one example, the set of customer designated conditions for deploying an artifact to a target computing environment 1108 may depend at least in part on one or more attributes of the artifact. A customer may designate a first set of one or more conditions for deploying a first set of one or more types of artifacts and a second set of one or more conditions for deploying a second set of one or more types of artifacts that differ from the first set of one or more conditions.

In one example, the artifacts that are deployed to a target computing environment 1108 include one or more of the following: container artifacts, application code artifacts, database artifacts, monitoring and logging artifacts, or security policy artifacts. Container artifacts may include docker files and images containing application dependencies, libraries, and/or runtime environments. The container artifacts may be packaged into containers for deployment. Additionally, or alternatively, the container artifacts may include container registries for storing and distributing container images. Application code artifacts may include code, scripts, resources for applications, installation packages, binaries, infrastructure as code, and/or deployment templates. Database artifacts may include artifacts for relational databases, NoSQL databases, and/or data migration. Database artifacts for relational databases may include SQL scripts, database schemas, and/or data definition language (DDL) scripts for deploying relational databases. Database artifacts for NoSQL databases may include configuration files and/or schema definitions. Database artifacts for data migration may include data migration scripts, for example, for migrating data between different database versions and/or platforms. Monitoring and logging artifacts may include monitoring agents, configuration files for monitoring systems, and/or configuration files for logging frameworks. Security policy artifacts may include security configuration files, security framework files, certificate authority (CA) configuration files, digital certificates, public keys, private keys, key pairs, and/or IAM configuration files.

In one example, the artifacts that are deployed to a target computing environment 1108 include artifacts associated with one or more of the following: operating system updates, database upgrades, software upgrades, patch management, library and framework updates, infrastructure maintenance, version control, dependency management, backup and recovery, capacity planning, health checks and monitoring, change management, or incident response. Additionally, or alternatively, the artifacts that may be deployed to a target computing environment 1108 may include artifacts associated with one or more of the following: environment provisioning, auto-scaling, configuration management, continuous integration (CI), continuous deployment (CD), rolling deployments, blue-green deployments, canary deployments, A/B testing, load balancing, data migration, disaster recovery.

Operating system updates includes installing updates and patches for operating systems, for example, to implement new features and/or to address security vulnerabilities, bugs, or performance issues. Database upgrades includes upgrading database software to newer versions or applying patches, for example, to improve performance, security, and reliability. Software upgrades includes upgrading software components, libraries, or dependencies, for example to provide new features, improvements, and/or security enhancements. Patch management includes applying patches, security updates, and/or bug fixes to software or systems, for example, to address vulnerabilities and improve stability. Library and framework updates includes updating libraries, frameworks, and/or dependencies used in applications, for example, to leverage new features and enhancements. Infrastructure maintenance includes performing routine maintenance tasks such as disk cleanup, system optimization, and/or security hardening, for example, to ensure optimal performance and security. Version control includes managing and tracking changes to code, configurations, and/or other artifacts. Dependency management includes managing dependencies between software components, for example, to ensure compatibility and/or to resolve conflicts. Backup and recovery includes creating backups of data and/or configurations and implementing recovery procedures to restore systems, for example, in case of data loss or corruption. Capacity planning includes monitoring resource usage and predicting future demand, for example, to scale infrastructure appropriately and/or to avoid performance degradation or service interruptions. Health checks and monitoring includes conducting periodic or intermittent health checks and/or monitoring system metrics, for example, to detect issues and proactively address them. Change management includes processes and controls to manage changes to systems, applications, and/or infrastructure, for example, to minimize disruptions and risks. Incident response includes responding to incidents, investigating root causes, and/or implementing corrective actions.

Environment provisioning includes instantiation and configuration of development, testing, and/or production environments. Configuration management includes managing and maintaining configurations throughout the cloud environment. CI includes automating the process of integrating code changes throughout the cloud environment. CD includes deploying code changes throughout the cloud environment, for example, after passing automated tests. Autoscaling includes automatically adjusting the number of resources in the cloud environment based on demand, for example, to optimize performance and cost. Rolling deployments includes gradually deploying changes to subsets of the cloud environment, for example, to minimize downtime and risk. Blue-green deployments includes deploying changes to a parallel environment (blue) before routing traffic from the existing environment (green), for example, to minimize downtime. Canary deployments includes releasing changes to a subset of the cloud environment and/or to a subset of users, for example, to test for issues, before rolling out the changes to the entire cloud environment and/or user base. A/B testing includes testing two or more versions of an application or feature with different portions of the cloud environment and/or user groups, for example, to compare performance and/or user experience. Load balancing includes distributes incoming traffic across multiple servers or instances, for example, to improve reliability and performance. Data migration includes transferring data between different storage systems or databases, for example, while maintaining data integrity and consistency. Disaster recovery includes processes and procedures to recover from system failures or disasters and restore services quickly.

ii. Example Artifact Deployment Tools

The virtual cloud network 1102 may include one or more different types of artifact deployment tools 1106 for deploying artifacts to target computing environments 1108. Different artifact deployment tools 1106 may be utilized for the same types of artifacts and/or for different types of artifacts. Additionally, or alternatively, different artifact deployment tools 1106 may be utilized for the same target computing environments 1108 and/or for different target computing environments 1108. An artifact deployment tool may include one or more of the following: a configuration deployment tool, a maintenance management tool, an administrator tool, or a command line interface. In one example, the set of customer designated conditions for deploying an artifact to a target computing environment 1108 may depend at least in part on one or mor attributes of the artifact deployment tool 1106. A customer may designate a first set of one or more conditions for utilizing a first deployment tool 1106 to deploy artifacts to target computing environments 1108 and a second set of one or more conditions for utilizing a second deployment tool 1106 to deploy artifacts to target computing environments 1108 that differ from the first set of one or more conditions.

A configuration deployment tool may include an application that automates deployment and management of artifacts throughout a cloud environment. Artifacts deployed to a cloud environment by a configuration deployment tool may pertain to configuration or settings for various resources in the cloud environment. A configuration deployment tool may utilize declarative or imperative scripts to define the desired state of the cloud environment and may deploy artifacts to ensure consistency in configuration settings throughout the cloud environment. A configuration deployment tool may streamline the process of provisioning and maintaining a cloud environment, for example, by automating tasks such as installing software, configuring services, and managing system settings. A configuration deployment tool may help ensure that various resources of a cloud environment are configured according to predefined specifications. Deployment of artifacts by a configuration management tool may reduce manual errors and/or promote consistency in deployment of artifacts throughout the cloud environment.

A maintenance management tool may include an application that automates deployment and management of artifacts pertaining to maintaining and managing a cloud environment. Artifacts deployed to a cloud environment by a maintenance management tool may pertain to maintenance or management task for the cloud environment such as one or more of the following: software updates, patch management, configuration changes, or monitoring system health resources. A maintenance management tool may automate various maintenance or management tasks. Deployment of artifacts by a maintenance management tool may enable proactive maintenance practices, reduce downtime, enhance security, and/or optimize resource utilization.

An administrator tool may include an application that streamlines administrative tasks related to operating a cloud environment and/or various services deployed in the cloud environment. Artifacts deployed to a cloud environment by an administrator tool may pertain to administrative activities such as technical support, troubleshooting, and/or proactive measures to ensure the reliability and security of the cloud environment.

A command-line interface includes a text-based interface that is configured to interact with the cloud environment through command-line commands. A command-line interface provide operators with a way to deploy artifacts to the cloud environment directly from a terminal or command prompt. A command-line interface may be utilized by cloud operators to deploy artifacts to the cloud environment in connection with a wide range of operations, including one or more of the following: management, software installation, configuration changes, upgrades, and/or patches.

iii. Example Target Computing Environments

A target computing environment 1108 may include one or more portions of a computing environment, such as the virtual cloud network 1102, where an artifact is deployed. In one example, a target computing environment 1108 includes a partition 1104 where an artifact is deployed. Additionally, or alternatively, a target computing environment 1108 may include a set of one or more resources 1110 where the artifact is deployed and/or a portion of a computing environment where a set of one or more resources 1110 that utilize the artifact are located. A partition 1104 and/or a resource 1110 corresponding to a target computing environment 1108 may be identified based on a resource identification number and/or a network address.

The resources 1110 may include a hardware or software component that is utilized to build, maintain, or operate a cloud infrastructure and/or services deployed in the cloud infrastructure. A hardware resource may include one or more of the following: a server, a processor, a memory device, a storage device, or a networking device. A software resource may include one or more of the following: an operating system, a cloud management platform, a security platform, a development tool, a compute instance, a virtual machine, a container, a serverless computing platform, an auto-scaling application, a storage platform, a networking application, or a service deployed in a cloud environment. In one example, one or more services deployed in the cloud infrastructure are resources with respect to one or more other services in the cloud infrastructure.

In one example, the set of customer designated conditions for deploying an artifact to a target computing environment 1108 may depend at least in part on one or more attributes of the target computing environment 1108 where the artifact is deployed. Additionally, or alternatively, the set of customer designated conditions for deploying an artifact may depend at least in part on one or more attributes of a set of one or more resources 1110 that utilize the artifact. A customer may designate a first set of one or more conditions for utilizing a first deployment tool 1106 to deploy artifacts to target computing environments and a second set of one or more conditions for utilizing a second deployment tool 1106 to deploy artifacts to target computing environments that differ from the first set of one or more conditions.

iv. Example Deployment Services

The deployment service 1112 may operate as an intermediary, such as a middleware, for deploying artifacts to target computing environments. In one example, the deployment service 1112 is a deployment service. The deployment service 1112 may receive deployment requests, obtain deployment tokens, and/or obtain validation of deployment token. Additionally, or alternatively, the deployment service 1112 may direct artifacts to target computing environments for deployment. In one example, the deployment service 1112 may The deployment service 1112 may interact with a data corpus that includes information, or metadata, pertaining to various target computing environments. Additionally, or alternatively, the data corpus may include information, or metadata, pertaining to various resources 1110 in the cloud environment. Additionally, or alternatively, the deployment service may interact with configuration files associated with various resources 1110 to obtain information, or metadata, pertaining to the various resources 1110 and/or the target computing environments where the resources are located.

In one example, the deployment service 1112 may determine, based on attributes corresponding to a target computing environment and/or particular resources 1110 in the target computing environment, whether distribution of artifacts to the target computing environment and/or to a particular resource 1110 in the target computing environment is conditioned on successful validation of a deployment token. When the deployment service 1112 receives a deployment request, the deployment service 1112 may determine that distribution of artifacts to the target computing environment and/or to the particular resource 1110 in the target computing environment is conditioned on successful validation of a deployment token. In response to determining that distribution of artifacts is conditioned on successful validation of a deployment token, the deployment service 1112 may determine whether a deployment token is included with the deployment request. Additionally, or alternatively, the deployment service 1112 may obtain a deployment token for distribution of the artifact. The deployment service 1112 may validate the deployment token and, upon successfully validating the deployment token, the deployment service 1112 may direct the artifact to the target computing environment for deployment. If a deployment token is not included with the deployment request and/or if the deployment service 1112 is unable to obtain a deployment token, the deployment service 1112 may refrain from deploying the artifact. Additionally, or alternatively, the deployment service 1112 may direct a notification to the artifact deployment tool 1106 that submitted the deployment request. The notification may indicate that the deployment service 1112 is refraining from deploying the artifact and/or that distribution of the artifact is conditioned on successful validation of a deployment token. In response to determining that distribution of artifacts is not conditioned on successful validation of a deployment token, the deployment service 1112 may direct the direct the artifact to the target computing environment for deployment without requiring a deployment token.

In one example, the deployment service 1112 may utilize the data corpus and/or the configuration files to determine information, or metadata, for deploying artifacts to resources 1110. In one example, the deployment service 1112 may determine destination addresses of resources 1110 for directing artifacts to the resources 1110 for deployment. In one example, the deployment service 1112 may allow for decoupling of customer-facing endpoints from internal service architecture. The deployment service 1112 may map customer facing endpoints to destination addresses of resources 1110 in the cloud environment.

The deployment service 1112 may handle distribution of particular artifacts to particular target computing environments and/or resources 1110. Additionally, or alternatively, the deployment service 1112 may roll-out artifacts to sets of resources 1110, for example, in connection with environment-wide changes. The deployment service 1112 may coordinate acquisition and/or validation of deployment tokens for respective target computing environments and/or resources that are part of the environment-wide changes. In one example, an environment-wide change may include deploying one or more artifacts throughout one or more partitions 1104 of the virtual cloud network 1102. Additionally, or alternatively, an environment-wide change may include deploying one or more artifacts to a particular set of resources 1110 located in one or more partitions 1104 of the virtual cloud network 1102. The set of resources 1110 may include multiple instances of a particular resource 1110 and/or different types of resources 1110.

In one example, the deployment service 1112 may interact with an IAM service to authenticate various entities associated with deployment requests and/or to determine whether the various entities are authorized to initiate deployment requests in accordance with applicable access policies. The entities authenticated by the deployment service 1112 may include resource principals associated with the artifact deployment tools 1106 and/or user principals associated with users that initiate deployment requests via the artifact deployment tools 1106.

B. Example Artifact Verification Service

Referring to FIG. 11B, features of a system 1100 are further described in accordance with one or more embodiments. The features described with reference to FIG. 11B include features for conditioning deployment of artifacts to a computing environment on verification that a set of one or more customer designated conditions are satisfied. As shown in FIG. 11B, the system 1100 includes at least one verification service 1120. Additionally, the system 1100 may include an operator device interface 1122, a data corpus 1124, and/or an IAM service 1126.

The verification service 1120 executes operations for providing customer designated conditions for deployment of artifacts to a computing environment. Additionally, the verification service 1120 executes operations for verifying that the customer designated conditions are satisfied. In one example, as shown in FIG. 11B, different instances of a verification service 1120 may be deployed in various partitions 1104 of a virtual cloud network 1102. As shown in FIG. 11B, partition 1104a includes verification service 1120a, partition 1104n includes verification service 1120n, and partition 1104z includes verification service 1120z.

In one example, a verification service 1120 may be implemented as a service that is deployed in the cloud environment. Various artifact deployment tools 1106 (FIG. 11A) and/or various deployment services 1112 (FIG. 11A) may interact with the verification service 1120, for example, in connection with deploying artifacts to target computing environments 1108 (FIG. 11A). Additionally, or alternatively, a verification service 1120 may be implemented as a component of an artifact deployment tool 1106. The artifact deployment tool 1106 may execute operations of the verification service 1120, for example, in connection with deploying artifacts to target computing environments 1108. Additionally, or alternatively, a verification service 1120 may be implemented as a component of a deployment service 1112 (FIG. 11A). The deployment service 1112 may execute operations of the verification service 1120, for example, in connection with deploying artifacts to target computing environments 1108. In one example, a first set of one or more features of a verification service 1120 may be implemented as components of an artifact deployment tool 1106 and a second set of one or more features of the verification service 1120 may be implemented as components of a deployment service 1112. Additionally, or alternatively, one or more features of a verification service 1120 may be implemented as a service deployed in the cloud environment that interacts with various artifact deployment tools 1106 and/or with various deployment services 1112 that respectively include other features of the verification service 1120.

As shown with reference to FIG. 11B, a verification service 1120 includes one or more of the following: a condition designation module 1128, a deployment request evaluation module 1130, a verification module 1132, or a deployment token provisioning module 1134. One or more of the condition designation module 1128, the deployment request evaluation module 1130, the verification module 1132, and/or the deployment token provisioning module 1134, may be respectively implemented in different instances of a verification service 1120. In one example, the different instances of the verification service 1120 may be implemented as a component of an artifact deployment tool 1106, as a component of a deployment service 1112, and/or as a service deployed in the cloud environment that interacts one or more artifact deployment tools 1106 and/or with one or more deployment services 1112.

i. Example Condition Designation Module

A verification service 1120 may include a condition designation module 1128. The condition designation module 1128 may associate customer designated conditions with target computing environments 1108 (FIG. 11A). In one example, the condition designation module 1128 determines customer designated conditions based on inputs from the operator device interface 1122. The inputs may identify a target computing environment 1108 and a set of one or more conditions for deploying artifacts to the target computing environment 1108. Additionally, or alternatively, the inputs may identify a set of one or more artifacts that the set of one or more conditions apply to, for example, based on one or more artifact attributes.

In one example, a customer designated condition includes verification that an approval to deploy an artifact to the computing environment has been obtained. The customer designated condition may further include verification that the approval is obtained in accordance with an approval workflow defined by the customer. The approval workflow may include one or more operations described in one or more of the following U.S. patent applications, each of which are incorporated herein by reference: U.S. patent application Ser. No. 18/647,781, titled "Consent-Driven Access Management For Cloud Resources," filed Apr. 26, 2024; U.S. patent application Ser. No. 18/410,231, titled "Issuing Surrogate Credentials For Accessing Target Resources," filed Jan. 11, 2024; U.S. patent application Ser. No. 18/529,558, titled "Issuing Delegate Credentials for Accessing Target Resources," filed Dec. 5, 2023; U.S. patent application Ser. No. 18/640,885, titled "Determining Approval Workflows for Obtaining Approvals to Access Resources," filed Apr. 19, 2024; or U.S. patent application Ser. No. 18/539,987, titled "Re-Executing an Authorization Process to Determine an Updated Set of Authorized Actions That may be Initiated by a Computing Entity During a Session," filed Dec. 14, 2023.

Additionally, or alternatively, the customer designated conditions may include verification that a set of one or more deployment states of a target computing environment designated by a customer are satisfied. The set of deployment states may include one or more of the following: a deployment time for deploying artifacts to the target computing environment; a deployment sequence for deploying artifacts to the target computing environment; or a deployment frequency for deploying artifacts to the target computing environment. A deployment state of the target computing environment may be determined based on a snapshot that represents a state of the target computing environment as of a particular point in time. The snapshot reflects data, configurations, and/or settings of the target computing environment. In one example, the snapshot may be a backup or disaster recovery snapshot obtained at least in part for backup or disaster recovery purposes. Additionally, or alternatively, the snapshot may be a deployment snapshot obtained for the particular purpose of deploying artifacts to the target computing environment. At least a portion of a snapshot may be obtained from logs or scripts generated by a telemetry or monitoring service. Additionally, or alternatively, at least a portion of the snapshot may be obtained directly from resources in the cloud environment.

Verification of the deployment time for deploying artifacts to the target computing environment may include verifying that the deployment time coincides with one or more time windows. The one or more time windows may include at least one of: one or more times of day, one or more days of week, one or more days of month, or one or more days of year. The deployment time, such as the one or more time windows, may be specified by the customer. Additionally, or alternatively, a cloud infrastructure provider may specify a deployment time, such as one or more time windows, for deploying artifacts to the target computing environment. The customer may include a deployment time specified by the cloud infrastructure provider as a customer designated condition, for example, to verify that artifacts are deployed in accordance with the deployment time specified by the cloud infrastructure provider corresponding to the target resource.

Verification of the deployment sequence for deploying an artifact to the target computing environment may include verification that deployment of the artifact satisfies one or more version control conditions. The version control conditions may include verification that the artifact follows a specified promotion sequence. The specified promotion sequence may be configured to ensure that the artifact is compatible with a previous iteration of the artifact, the target computing environment, other computing environments, other resources in the target computing environment and/or in other computing environments. The specified promotion sequence may include a sequence for incrementing from a particular iteration of an artifact to a next iteration of the artifact. Additionally, or alternatively, the promotion sequence may include a sequence for parallel incrementation of sets of artifacts that interact with one another or that are dependent upon one another. In one example, the promotion sequence may provide for concurrent distribution of a set of one or more artifacts to a set of target computing environments. Additionally, or alternatively, the promotion sequence may condition providing a first artifact to resource A on verification that a second artifact has previously been provided to resource B. The second artifact may correspond to a particular version number relative to the first artifact. Additionally, or alternatively, the promotion sequence may preclude skipping versions.

Verification of the deployment frequency for deploying artifacts to the target computing environment may include verification that multiple artifacts is not scheduled for deployment concurrently with one another and/or that deployment periods are not overlapping. Additionally, or alternatively, the deployment frequency may include a condition that limits a quantity of deployments within a particular time window. The quantity of deployments may be limited with respect to a particular target computing environment, a particular resource, and/or a particular type of artifact.

Additionally, or alternatively, the customer designated conditions may include verification that a change ticket associated with deployment of an artifact to the target computing environment satisfies a set of one or more ticket verification criteria. The ticket verification criteria may be selected based on a source of the change ticket. A first set of criteria corresponds to change tickets originating from a source that is identifiable by an identity resource associated with the customer. A second set of criteria corresponds to change tickets originating from a source that is identifiable by an identity resource associated with a cloud infrastructure provider corresponding to the target resource. The change ticket criteria may include one or more of the following: verification that the change ticket is active, verification that the change ticket is approved, or verification that a current execution time is within an approval change window for the change ticket.

ii. Example Deployment Request Evaluation Module

A verification service 1120 may include a deployment request evaluation module 1130. The deployment request evaluation module 1130 detects deployment requests to deploy an artifact to a target computing environment. In one example, when the deployment request evaluation module 1130 detects a deployment request, the deployment request evaluation module 1130 may determine whether deployment of the artifact is conditioned on verification that a set of customer designated conditions are satisfied. Additionally, or alternatively, the deployment request evaluation module 1130 may determine the particular customer designated conditions that are applicable to a particular deployment request. Additionally, or alternatively, the deployment request evaluation module 1130 may determine whether deployment of the artifact to the target computing environment is conditioned on having a valid deployment token. In one example, when deployment of the artifact is conditioned on having a valid deployment token, the deployment request evaluation module 1130 may determine whether a deployment token has been provided in connection with the deployment request. When a deployment token is provided in connection with the deployment request, the deployment request evaluation module 1130 may prompt the verification module 1132 to verify that the deployment token is valid. Additionally, or alternatively, when deployment of the artifact is conditioned on having a valid deployment token, the deployment request evaluation module 1130 may prompt the deployment token provisioning module 1134 to initiate a process for obtaining a deployment token.

In one example, the deployment request evaluation module 1130 may determine, based at least in part on the particular target computing environment where an artifact is being deployed, whether deployment of the artifact is conditioned on verification that a set of customer designated conditions are satisfied. Additionally, or alternatively, the deployment request evaluation module 1130 may determine, based at least in part on the particular target computing environment where the artifact is being deployed, whether deployment of the artifact is conditioned on successfully validating a deployment token corresponding to the deployment. The deployment request evaluation module 1130 may base the determination at least in part on a set of one or more attributes of the target computing environment. In one example, deployment of an artifact to a first target computing environment that has a first set of one or more attributes, is conditioned on verification that a set of customer designated conditions are satisfied and/or on successful validation of a deployment token corresponding to the deployment. Additionally, in one example, a second target computing environment that has a second set of one or more attributes is not subject to customer designated conditions on deployment of the artifact and the artifact can be deployed to the second target computing environment without having a valid deployment token corresponding to the deployment.

The set of one or more attributes of a target computing environment may include one or more of the following: a resource identification number, a network address, a partition identification number, a host name, a subnet, a set of one or more resources deployed in the target computing environment, a customer associated with the target computing environment, an identity resource associated with the target computing environment, or an access policy associated with the target computing environment. The set of one or more attributes of the target computing environment may be stored in the data corpus 1124 and/or in metadata associated with the target computing environment. The deployment request evaluation module 1130 may reference one or more of the attributes of the target computing environment to determine whether deployment is conditioned on verifying satisfaction of customer designated conditions and/or to determine whether deployment is conditioned on validation of a deployment token.

In one example, the deployment request evaluation module 1130 may determine, based at least in part on the particular artifact that is being deployed, whether deployment of the artifact is conditioned on verification that a set of customer designated conditions are satisfied. Additionally, or alternatively, the deployment request evaluation module 1130 may determine, based at least in part on the particular artifact that is being deployed, whether deployment of the artifact is conditioned on successfully validating a deployment token corresponding to the deployment. The deployment request evaluation module 1130 may base the determination at least in part on a set of one or more attributes of the artifact. In one example, deployment of an artifact that has a first set of one or more attributes is conditioned on verification that a set of customer designated conditions are satisfied and/or on successful validation of a deployment token corresponding to the deployment. Additionally, in one example, a second artifact that has a second set of one or more attributes is not subject to customer designated conditions on deployment of the artifact and the artifact can be deployed without having a valid deployment token corresponding to the deployment.

The set of one or more attributes of an artifact may include one or more of the following: an artifact type attribute, a configuration attribute, a metadata attribute, a resource attribute, a lifecycle attribute, an operational attribute, a security attribute, a performance attribute, an interoperability attribute, or a compliance attribute. An artifact type attribute includes a kind or category of the artifact. A configuration attribute includes one or more configuration settings or parameters associated with the artifact. A metadata attribute includes information about the artifact stored in metadata. A lifecycle attribute includes a period of the lifecycle of the artifact, such as whether the current period of the artifact is developmental, testing, staging, production, or decommissioning. An operational attribute includes an operational aspect of the artifact, such as a monitoring aspect, a logging aspect, an alerting aspect, a backup aspect, or a disaster recovery aspect. A security attribute indicates one or more security features of the artifact, such as an encryption feature, an authentication feature, or an authorization feature. A performance attribute includes one or more performance characteristics of the artifact, such as a throughput characteristic, a latency characteristic, a response time characteristic, a concurrency characteristic, or a scalability characteristic. A interoperability attribute includes one or more attributes pertaining to a compatibility or interoperability of the artifact with other systems, platforms, protocols, and/or standards. A compliance attribute indicates whether the artifact complies with one or more of the following: a regulatory requirement, a data privacy requirement, a security requirement, an industry standard, or an organizational policy, as well as combinations of these. The set of one or more attributes of the artifact may be stored in the data corpus 1124 and/or in metadata associated with the artifact. The deployment request evaluation module 1130 may reference one or more of the attributes of the artifact to determine whether deployment of the artifact is conditioned on verifying satisfaction of customer designated conditions and/or to determine whether deployment of the artifact is conditioned on validation of a deployment token.

iii. Example Verification Module

A verification service 1120 may include a verification module 1132. In one example, the verification module 1132 may verify that a set of customer designated conditions on deployment of an artifact to a target computing environment are satisfied. The deployment request evaluation module 1130 may provide an indication to the verification module 1132 that deployment of the artifact is conditioned on verification that a set of customer designated conditions are satisfied. The verification module 1132 may verify that the set of customer designated conditions are satisfied in response to the indication from deployment request evaluation module 1130. In one example, the indication from the deployment request evaluation module 1130 includes an indication of the particular customer designated conditions that are applicable to a particular deployment request. Additionally, or alternatively, the verification module 1132 may determine the particular customer designated conditions that are applicable to a particular deployment request.

In one example, the verification module 1132 may validate a deployment token representing verification that a set of customer designated conditions on deployment of an artifact to a target computing environment are satisfied. The deployment request evaluation module 1130 may provide an indication to the verification module 1132 that deployment of the artifact to the target computing environment is conditioned on having a valid deployment token. In one example, the deployment request evaluation module 1130 may provide a deployment token corresponding to a deployment request to the verification module 1132, and the verification module may validate the deployment token. Additionally, or alternatively, the verification module may obtain and/or receive a deployment token corresponding to a deployment request from the deployment token provisioning module 1134.

In one example, the verification module 1132 includes one or more of the following: an operator approval submodule 1136, a deployment state submodule 1138, a change ticket submodule 1140. The operator approval submodule 1136 initiates a workflow for obtaining an approval, corresponding to a customer designated condition associated with a deployment request, to deploy an artifact to a target computing environment. The workflow may be designated by the customer via the condition designation module 1128. The operator approval submodule 1136 may verify that the approval to deploy the artifact has been obtained. In one example, the operator approval submodule 1136 may verify that the approval to deploy the artifact has been obtained prior to the deployment token provisioning module 1134 obtaining a deployment token corresponding to the deployment request. The deployment state submodule 1138 verifies that a set of one or more deployment states, corresponding to one or more customer designated conditions associated with a deployment request, are satisfied. In one example, the deployment state submodule 1138 may verify that the set of one or more deployment states are satisfied prior to the deployment token provisioning module 1134 obtaining a deployment token corresponding to the deployment request. The change ticket submodule 1140 verifies that a set of one or more ticket verification criteria are satisfied for a change ticket corresponding to one or more customer designated conditions associated with a deployment request. In one example, the deployment state submodule 1138 may verify that the set of one or more ticket verification criteria are satisfied prior to the deployment token provisioning module 1134 obtaining a deployment token corresponding to the deployment request.

In one example, the verification module 1132 includes a deployment token validation submodule 1142. The deployment token validation submodule validates deployment tokens associated with deployment requests. The deployment tokens validated by the deployment token validation submodule 1142 may include deployment tokens obtained by the deployment token provisioning module 1134 and/or deployment tokens provided with a deployment token request. In one example, the deployment token includes a digital signature generated by an entity that issues the deployment token. The digital signature may be generated using a symmetric key or an asymmetric key. The deployment token validation submodule 1142 may validate the deployment token at least by verifying the digital signature of the deployment token, for example, using symmetric key verification or asymmetric key verification, as applicable.

For symmetric key verification, the digital signature includes a cryptographic hash of content of the deployment token generated using a secret key. To verify the digital signature using symmetric key verification, the deployment token validation submodule 1142 generates a cryptographic hash of the content of the deployment token using the same secret key utilized to generate the digital signature. The deployment token validation submodule 1142 compares the cryptographic hash generated using the secret key to the cryptographic hash include in the digital signature.

For asymmetric key verification, an asymmetric key pair including a private key and a public key are utilized. The digital signature includes a cryptographic hash of content of the deployment token generated using the private key. To verify the digital signature using asymmetric key verification, the deployment token validation submodule 1142 generates a cryptographic hash of the content of the deployment token using the public key. The deployment token validation submodule 1142 compares the cryptographic hash generated using the public key to the cryptographic hash include in the digital signature.

The deployment token validation submodule 1142 determines that a deployment token is valid when the cryptographic hash generated by the deployment token validation submodule 1142 matches the cryptographic hash included in the digital signature. The deployment token validation submodule 1142 determines that a deployment token is invalid when the cryptographic hash generated by the deployment token validation submodule 1142 does not match the digital signature. Additionally, or alternatively, the deployment token validation submodule 1142 may validate a deployment token based on one or more other validation techniques. For example, the deployment token validation submodule 1142 may validate a deployment token based on one or more of the following: token structure, token decoding, payload claims checking, or custom validation logic.

Additionally, or alternatively, in one example, the deployment token validation submodule 1142 may validate a deployment token based on one or more identity resources in an IAM service. In one example, the deployment token validation submodule 1142 may validate one or more identity resources associated with the holder of the deployment token and/or the source of the deployment request. The deployment token validation submodule 1142 may validate that the one or more identity resources has sufficient permissions to utilize the deployment token in accordance with one or more access policies in the IAM service.

iv. Example Deployment Token Provisioning Module

A verification service 1120 may include a deployment token provisioning module 1134. The deployment token provisioning module 1134 may provision deployment tokens that represent verification that a set of one or more customer designated conditions are satisfied to deploy an artifact to a target computing environment.

In one example, the deployment token provisioning module 1134 may issue deployment tokens. In one example, the deployment token provisioning module 1134 may issue deployment tokens in response to token requests and/or deployment requests, for example, from an artifact deployment tool 1106 (FIG. 11A). The deployment token provisioning module 1134 may issue deployment tokens at least in part responsive to verification that a set of one or more customer designated conditions are satisfied to deploy an artifact to a target computing environment. In one example, the deployment token provisioning module 1134 may obtain verification from the verification module 1132 that a set of one or more customer designated conditions to deploy an artifact to a target computing environment are satisfied. In one example, the deployment token provisioning module 1134 may obtain verification from the verification module 1132 in response to a token request and/or deployment requests. The deployment token provisioning module 1134 may issue a deployment token in response to the verification from the verification module 1132.

In one example, the deployment token provisioning module 1134 may obtain deployment tokens from an IAM service 1126. The deployment token provisioning module 1134 may direct a token request to the IAM service 1126. The deployment token provisioning module 1134 may direct the token request to the IAM service 1126 in response to an artifact deployment request, for example, from an artifact deployment tool 1106 (FIG. 11A). The IAM service 1126 may issue deployment tokens at least in part responsive to verification that a set of one or more customer designated conditions are satisfied to deploy an artifact to a target computing environment. In one example, the IAM service 1126 may obtain verification from the verification module 1132 that a set of one or more customer designated conditions to deploy an artifact to a target computing environment are satisfied. Additionally, or alternatively, the token request may include verification that the set of one or more customer designated conditions are satisfied. The IAM service 1126 may issue a deployment token in response to the verification that the set of one or more customer designated conditions are satisfied.

The deployment tokens provided by the deployment token provisioning module 1134 may be included in deployment requests to deploy artifacts to a target computing environment. The deployment token provisioning module 1134 may provide the deployment token to an artifact deployment tool 1106 (FIG. 11A) and/or to a deployment service 1112 (FIG. 11A), for example, in response to a token request. The artifact deployment tool 1106 and/or the deployment service 1112 may include the deployment token in a deployment request.

C. Example Operator Device Interface

In one example, the operator device interface 1122 is couplable or communicatively coupled with the verification service 1120. The operator device interface 1122 may include hardware and/or software configured to facilitate interactions between an operator and the verification service 1120 and/or other aspects of the system 1100. The operator device interface 1122 may render user interface elements and receive input via user interface elements. The operator device interface 1122 receive inputs to the verification service 1120. Additionally, or alternatively, the operator device interface 1122 may display outputs generated by the verification service 1120. Examples of interfaces include a GUI, a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interfaces or interface elements may be utilized by the operator device interface 1122.

In an embodiment, different components of an operator device interface 1122 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, the operator device interface 1122 may be specified in one or more other languages, such as Java, C, or C++.

In one example, the verification service 1120 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, an intermediary server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

D. Example Data Corpus

Referring to FIG. 12, features of an example data corpus 1200 are further described. The data corpus 1200 described with reference to FIG. 12 may be included in one or more embodiments described with reference to FIGS. 11A and 11B. The data corpus 1124 described with reference to FIG. 11B may include one or more features described with reference to the data corpus 1200 described with reference to FIG. 12. The verification service 1120 (FIG. 11B) may execute operations based on information obtained in the data corpus 1200. Additionally, or alternatively, information described with reference to the data corpus 1200 may be implemented in metadata associated with one or more components of the system described with reference to FIGS. 11A and 11B.

As shown in FIG. 12, a data corpus 1200 includes a data structure with one or more customer designated conditions 1202 to deploying artifacts to a target computing environment. In one example, the data corpus 1200 includes customer designated condition 1202a, customer designated condition 1202b, customer designated condition 1202c, customer designated condition 1202d, customer designated condition 1202e, and customer designated condition 1202n. The one or more customer designated conditions may respectively include one or more of the following data elements: a target computing environment 1204, a destination address 1206 corresponding to the target computing environment 1204, a token requirement indication 1208 that indicates whether a deployment token is required for deploying artifacts to the target computing environment 1204, an artifact type indication 1210 that indicates one or more types of artifacts that are subject to the customer designated condition 1202, a set of one or more verifications 1212 corresponding to the customer designated condition 1202, and a status 1214 of the set of one or more verifications.

The target computing environment 1204 may include one or more resources. The destination address 1206 may correspond to a location of the one or more resources in the target computing environment 1204. The artifacts may be deployed to the target computing environment 1204 at the destination address 1206. In one example, the system may determine whether a deployment token is required for deploying an artifact to the target computing environment 1204 based at least in part on the token requirement indication 1208. As shown in FIG. 12, the token requirement indication 1208 for customer designated condition 1202*e* indicates that a deployment token is not required for deploying artifacts to target computing environment 1204 corresponding to customer designated condition 1202*e*.

Additionally, or alternatively, the system may determine what types of artifacts require a deployment token based on the artifact type indication 1210. As shown in FIG. 12, the artifact type indication 1210 indicates that a deployment token is required for all artifacts deployed to the target computing environments 1204 corresponding to customer designated condition 1202*a*, customer designated condition 1202*d*, and customer designated condition 1202*n*. Additionally, the artifact type indication 1210 indicates that for the target computing environment 1204 corresponding to customer designated condition 1202*b*, a deployment token is required for deploying artifacts that meet one or more criteria corresponding to Type B. Additionally, the artifact type indication 1210 indicates that for the target computing environment 1204 corresponding to customer designated condition 1202*c*, a deployment token is required for deploying artifacts that meet one or more criteria corresponding to Type C.

The system may determine whether the verifications 1212 corresponding to a customer designated condition 1202 is satisfied based at least in part on the status 1214 corresponding to the verifications 1212. AS shown in FIG. 12, the status 1214 corresponding to the verifications 1212 for customer designated condition 1202*a*, customer designated condition 1202*b*, and customer designated condition 1202*n* indicate that the verifications 1212 are met. The status 1214 corresponding to the verifications 1212 for customer designated condition 1202*c* and customer designated condition 1202*d* indicate that at least one of the verifications 1212 is unmet.

In one or more embodiments, the data corpus 1200 is any type of storage unit and/or device (e.g., a file system, database, collection of tables, or any other storage mechanism) for storing data. Further, the data corpus 1200 may include multiple different storage units and/or devices. The multiple different storage units and/or devices may or may not be of the same type or located at the same physical site. Further, the data corpus 1200 may be implemented or executed on the same computing system as the verification service 1120 (FIG. 11B). Additionally, or alternatively, the data corpus 1200 may be implemented or executed on a computing system separate from the verification service 1120. The data corpus 1200 may be communicatively coupled to the verification service 1120 via a direct connection or via a network. Information describing the data corpus 1200 may be implemented across any of components of the system 1100 (FIGS. 11A and 11B). However, this information is described with reference to the data corpus 1200 for purposes of clarity and explanation.

4. Example Operations for Deploying Artifacts to a Cloud Environment

Figure 13A:
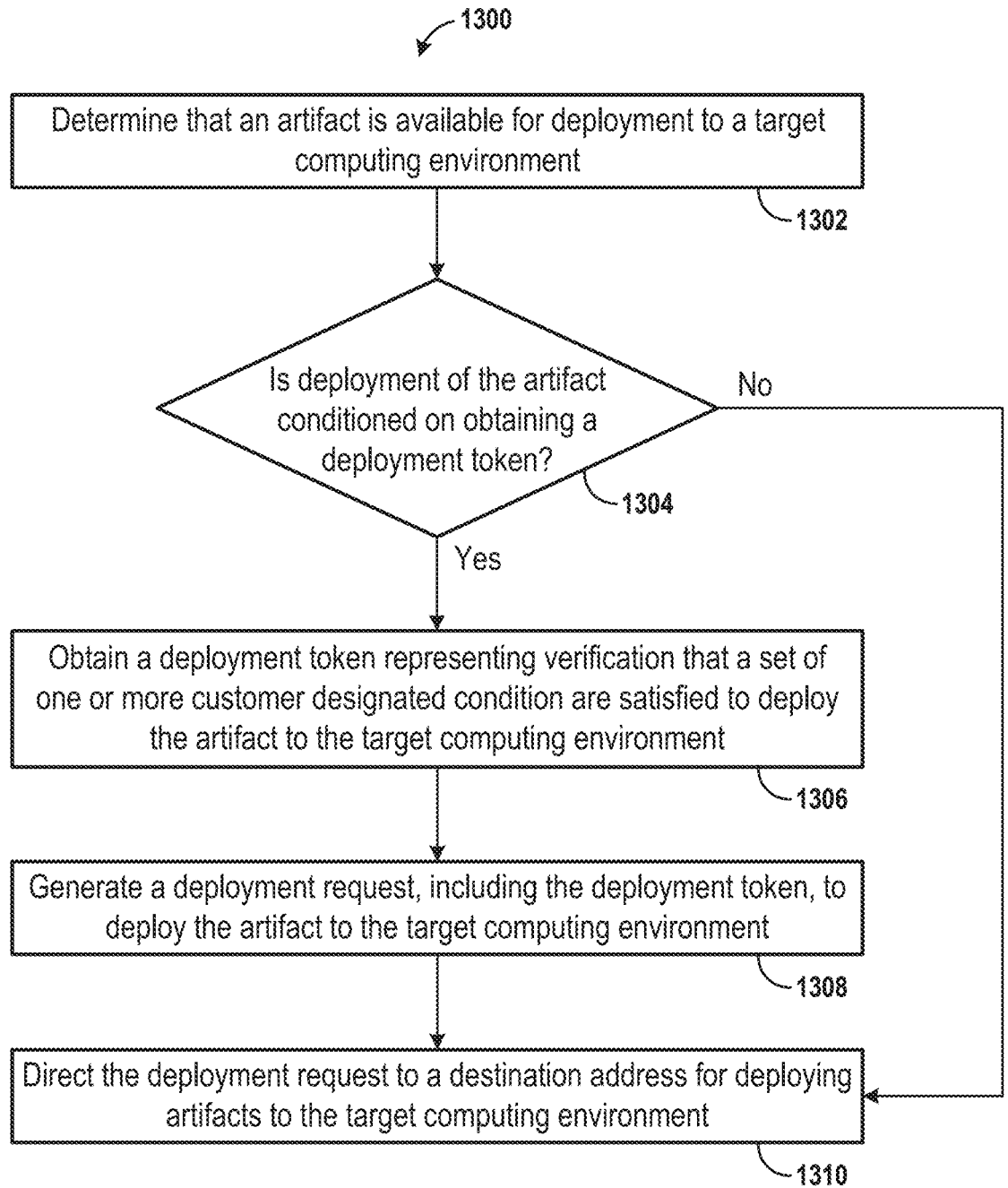
FIGS. 13A and 13B illustrate example operations for deploying artifacts to a cloud environment in accordance with one or more embodiments.
Figure 13B:
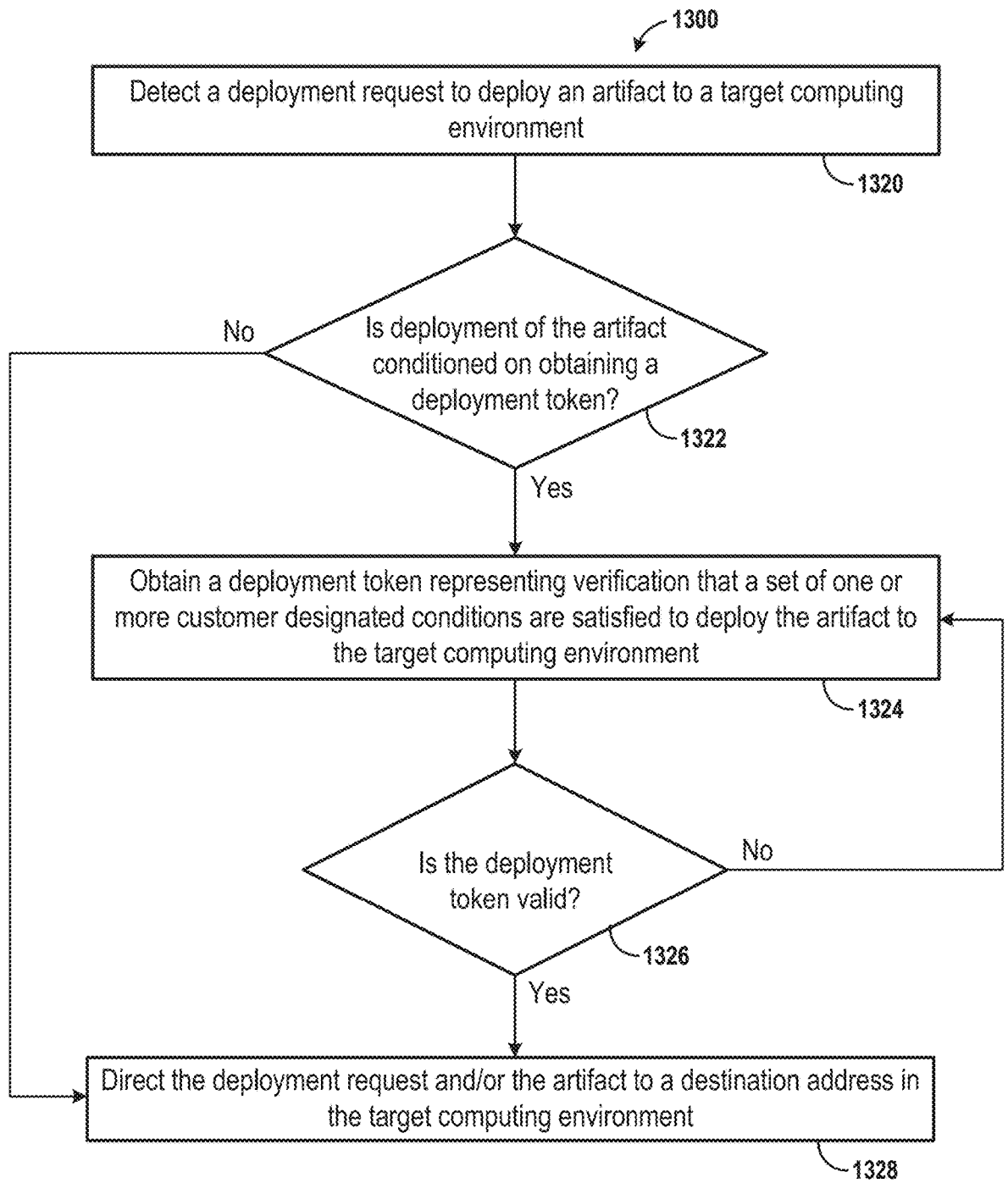

Referring to FIGS. 13A and 13B, example operations 1300 for deploying artifacts to a cloud environment are further described in accordance with one or more embodiments. One or more operations 1300 described with reference to FIGS. 13A and 13B may be modified, combined, rearranged, or omitted. Accordingly, the particular sequence of operations 1300 described with reference to FIGS. 13A and 13B should not be construed as limiting the scope of one or more embodiments. In one example, the operations 1300 may be performed by the one or more components of the system described with reference to FIGS. 11A and 11B.

A. Example Artifact Deployment Tool Operations

Referring to FIG. 13A, example operations 1300 associated with deploying an artifact to a target computing environment are described in accordance with one or more embodiments. In one example, the operations 1300 described with reference to FIG. 13A are performed at least in part by an artifact deployment tool. Additionally, or alternatively, the operations 1300 described with reference to FIG. 13A are performed at least in part by a verification service that interacts with the artifact deployment tool and/or that is incorporated into the artifact deployment tool. In one example, the target computing environment includes a PLC environment accessible using a first set of identity resources associated with a customer and a second set of identity resources associated with a cloud infrastructure provider. In one example, the artifact deployment tool and/or the verification service are operated by a requester associated with an identity resource of the second set of identity resources.

As shown in FIG. 13A, a system determines that an artifact is available for deployment to a target computing environment (Operation 1302). The system may determine that an artifact is available for deployment based on information generated and/or received by an artifact deployment tool. In one example, the artifact deployment tool may receive an indication that the artifact is available for deployment in response to an input from a user device interface. Additionally, or alternatively, the system may receive a deployment request to deploy an artifact to the target computing environment. The system may determine that the artifact is available for deployment to the target computing environment based on the deployment request.

The system determines whether deployment of the artifact is conditioned on obtaining a deployment token (Operation 1304). The system may determine that deployment of the artifact is conditioned on obtaining a deployment token based on data associated with target computing environment and/or based on data associated with the artifact. The data utilized by the system to determine whether deployment of the artifact is conditioned on obtaining a deployment token may be located in a data corpus and/or in metadata associated with the target computing environment and/or the artifact.

In one example, the system determines whether deployment of the artifact is conditioned on obtaining a deployment token based on a destination address in the deployment request. Additionally, or alternatively, in one example, deployment requests directed to a particular destination address trigger the system to initiate a process for obtaining a deployment token and/or for verifying that the set of one or more customer designated conditions are satisfied. When the system determines that a deployment request is directed to the particular destination address, based at least on the deployment request being directed to the particular destination address, the system initiates the process for obtaining a deployment token and/or verifying that the set of one or more customer designated conditions are satisfied.

In one example, the system determines whether deployment of the artifact is conditioned on obtaining a deployment token based on receiving a deployment request that is an artifact deployment request. Additionally, or alternatively, deployment requests that are artifact deployment requests trigger the system to initiate a process for obtaining a deployment token and/or for verifying that the set of one or more customer designated conditions are satisfied. When the system determines that a deployment request is an artifact deployment request, based at least on the deployment request being an artifact deployment request, the system initiates the process for obtaining a deployment token and/or verifying that the set of one or more customer designated conditions are satisfied.

In one example, the system may determine whether deployment of the artifact is conditioned on obtaining a deployment token based on an artifact corresponding to the deployment request. Additionally, or alternatively, deployment requests associated with a particular artifact trigger the system to initiate a process for obtaining a deployment token and/or verifying that the set of one or more customer designated conditions are satisfied. When the system determines that a deployment request corresponds to a particular artifact, based at least on the deployment request being directed to the particular artifact, the system initiates the process for obtaining a deployment token and/or verifying that the set of one or more customer designated conditions are satisfied.

When the system determined that deployment of the artifact is conditioned on obtaining a deployment token, the system obtains a deployment token representing verification that a set of one or more customer designated conditions are satisfied to deploy the artifact to the target computing environment (Operation 1306). In one example, prior to obtaining the deployment token, the system determines whether the set of one or more customer designated conditions are satisfied. Additionally, or alternatively, the system may receive a token request that includes an indication that the set of one or more customer designated conditions are satisfied.

In one example, obtaining the deployment token may include generating a deployment token. In one example, the artifact deployment tool may include a verification service and the verification service may include a deployment token provisioning module that issues a deployment token. Additionally, or alternatively, obtaining a deployment token may include generating a token request and directing the token request to a verification service that includes a deployment token provisioning module and/or to an IAM service that issues deployment tokens. In one example, the token request includes metadata pertaining to the artifact, and the verification service and/or the IAM service, upon receiving the token request, verifies that the set of one or more customer designated conditions are satisfied based at least in part on the metadata pertaining to the artifact. Upon the verification service having successfully verified that set of one or more customer designated conditions are satisfied, the verification service generates the deployment token and provides the deployment token to the artifact deployment tool. Upon the IAM service having successfully verified that set of one or more customer designated conditions are satisfied, the IAM service generates the deployment token and provides the deployment token to the verification service. The verification service may provide the deployment token to the artifact deployment tool. Obtaining the deployment token may include the artifact deployment tool receiving the deployment token in response to the token request.

Upon having obtained the deployment token, the system generates a deployment request, including the deployment token, to deploy the artifact to the target computing environment (Operation 1308). The deployment request may additionally include the artifact for deployment to the target computing environment. Additionally, or alternatively, the deployment request may include a location of the artifact, and a resource corresponding to the target computing environment may retrieve the artifact for deployment in the target computing environment.

In one example, subsequent to determining that an artifact is available for deployment to the target computing environment, the system may initiating a process to deploy the artifact to the target computing environment. The process may include initiating verification that the set of one or more customer designated conditions are satisfied and obtaining a deployment token upon having verified that the set of customer designated conditions are satisfied (Operation 1306). The system may pause the process while awaiting the deployment token representing verification that the set of one or more customer designated conditions are satisfied. Upon having obtained the deployment token, the system resumes the process. Upon having resumed the process, the system generates the deployment request (Operation 1308).

The system may initiate one or more attempts for verification that the set of one or more customer designated conditions are satisfied, for example, when obtaining the deployment token (Operation 1306). When the set of one or more customer designated conditions are unsatisfied, the system may generate a non-validation response indicating that the set of one or more customer designated conditions are unsatisfied. In one example, the verification service generates the non-validation response and transmits the non-validation response to the artifact deployment tool. Subsequent to generating the non-validation response, the system may initiate a subsequent attempt for verification that the set of one or more customer designated conditions are satisfied. In one example, the system may determine that the set of one or more customer designated conditions are satisfied in response to the subsequent attempt. In one example, the artifact deployment tool may initiate a subsequent token request after receiving the non-validation response. The system may obtain the deployment token (operation 1306) based at least in part on the subsequent attempt for verification that the set of one or more customer designated conditions are satisfied.

Upon having generated the deployment request, the system directs the deployment request to a destination address for deploying artifacts to the target computing environment (Operation 1310). In one example, the system directs the deployment request to a deployment service for deploying artifacts to the target computing environment. The deployment service receives the deployment request and the deployment token. In one example, the system directs the deployment request to a destination address, for example, in the target computing environment, and the deployment service intercepts the deployment request. The deployment service obtains validation of the deployment token (Operation 1326, FIG. 13B). In one example, the deployment service includes a verification service and the verification service includes a deployment token validation submodule that validates the deployment token. Additionally, or alternatively, the system may include a verification service that interacts with the deployment service, and the deployment service may direct the deployment token to the verification service for validation. The verification service may validate the deployment token and provide an indication to the deployment service that the deployment token was successfully validated.

In one example, the system may include metadata pertaining to the artifact in the token request. The metadata pertaining to the artifact may be utilized to verify that the set of one or more customer designated conditions are satisfied. Additionally, or alternatively, the metadata may be utilized to obtain the deployment token. In one example, obtaining the deployment token may include obtaining metadata pertaining to the artifact, for example, from a data corpus and/or a metadata file associated with the artifact, and including the metadata pertaining to the artifact in the token request. Upon receiving the token request, the system may verify that the set of one or more customer designated conditions are satisfied, and in response to verifying that the set of one or more customer designated conditions are satisfied, the system obtains the deployment token.

Upon successfully obtaining validation of the deployment token, the deployment service directs the deployment request and/or the artifact to a destination address in the target computing environment for deployment (Operation 1328, FIG. 13B). In one example, a resource in the target computing environment receives the deployment request and validates the deployment token included in the deployment request. In response to successfully validating the deployment token, the resource deploys the artifact in the target computing environment. The resource may receive the artifact for deployment with the deployment request and/or the resource may retrieve the artifact from a location indicated by the deployment request.

Referring again to operation 1304 and operation 1310, when the system determines that deployment of an artifact is not conditioned on obtaining a deployment token, the system directs the deployment request to a deployment service for deploying artifacts to the target computing environment. The deployment service receives the request and directs the deployment request and/or the artifact to the target computing environment for deployment.

B. Example Deployment Service Operations

Referring to FIG. 13B, example operations 1300 associated with utilizing a deployment service and/or a verification service for deploying an artifact to a target computing environment are described in accordance with one or more embodiments. In one example, the operations 1300 described with reference to FIG. 13B are performed at least in part by a deployment service. The deployment service may be configured to route requests to destination addresses in a target computing environment Additionally, or alternatively, the operations 1300 described with reference to FIG. 13B are performed at least in part by a verification service that interacts with the deployment service and/or that is incorporated into the deployment service. In one example, the target computing environment includes a PLC environment accessible using a first set of identity resources associated with a customer and a second set of identity resources associated with a cloud infrastructure provider. In one example, the deployment service and/or the verification service are operated by a requester associated with an identity resource of the second set of identity resources.

As shown in FIG. 13B, a system detects a request to deploy an artifact to a target computing environment (Operation 1320). In one example, the system detects the request at least in part by receiving a deployment request to deploy the artifact to the target computing environment. Additionally, or alternatively, the system may detect the deployment request at least in part by receiving a token request to obtain a deployment token for deploying the artifact to the target computing environment. The deployment request may include the artifact for deployment to the target computing environment. Additionally, or alternatively, the deployment request may include a location of the artifact, and the system may retrieve the artifact for deployment in the target computing environment.

In response to detecting the deployment request, the system determines whether deployment of the artifact is conditioned on obtaining a deployment token. (Operation 1322). The system may determine that deployment of the artifact is conditioned on obtaining a deployment token based on data included in the deployment request. Additionally, or alternatively, the system may determine that deployment of the artifact is conditioned on obtaining a deployment token based on data associated with target computing environment and/or based on data associated with the artifact. In one example, the system determines that deployment of the artifact to the target computing environment is conditioned on having a valid deployment token based on a set of one or more attributes of the target computing environment. The data utilized by the system to determine whether deployment of the artifact is conditioned on obtaining a deployment token may be located in a data corpus and/or in metadata associated with the target computing environment and/or the artifact. Additionally, or alternatively, the system may receive a token request, and the system may determine that deployment of the artifact is conditioned on obtaining a deployment token based on the token request.

In one example, the system determines whether deployment of the artifact is conditioned on obtaining a deployment token based on a destination address in the deployment request. Additionally, or alternatively, in one example, deployment requests directed to a particular destination address trigger the system to initiate a process for obtaining a deployment token and/or for verifying that the set of one or more customer designated conditions are satisfied. When the system determines that a deployment request is directed to the particular destination address, based at least on the deployment request being directed to the particular destination address, the system initiates the process for obtaining a deployment token and/or verifying that the set of one or more customer designated conditions are satisfied.

In one example, the system determines whether deployment of the artifact is conditioned on obtaining a deployment token based on receiving a deployment request that is an artifact deployment request. Additionally, or alternatively, deployment requests that are artifact deployment requests trigger the system to initiate a process for obtaining a deployment token and/or for verifying that the set of one or more customer designated conditions are satisfied. When the system determines that a deployment request is an artifact deployment request, based at least on the deployment request being an artifact deployment request, the system initiates the process for obtaining a deployment token and/or verifying that the set of one or more customer designated conditions are satisfied.

In one example, the system may determine whether deployment of the artifact is conditioned on obtaining a deployment token based on an artifact corresponding to the deployment request. Additionally, or alternatively, deployment requests associated with a particular artifact trigger the system to initiate a process for obtaining a deployment token and/or verifying that the set of one or more customer designated conditions are satisfied. When the system determines that a deployment request corresponds to a particular artifact, based at least on the deployment request being directed to the particular artifact, the system initiates the process for obtaining a deployment token and/or verifying that the set of one or more customer designated conditions are satisfied.

When the system determines that deployment of the artifact is conditioned on obtaining a deployment token, the system obtains a deployment token representing verification that a set of one or more customer designated conditions are satisfied to deploy the artifact to the target computing environment (Operation 1324). In one example, prior to obtaining the deployment token, the system determines whether the set of one or more customer designated conditions are satisfied. Additionally, or alternatively, the system may receive a token request that includes an indication that the set of one or more customer designated conditions are satisfied. In one example, obtaining a deployment token may include receiving a deployment token with the deployment request. Additionally, or alternatively, obtaining the deployment token may include issuing a deployment token. In one example, the deployment service may include a verification service and the verification service may include a deployment token provisioning module that issues a deployment token. Additionally, or alternatively, obtaining a deployment token may include generating a token request and directing the token request to a verification service that includes a deployment token provisioning module and/or to an IAM service that issues deployment tokens. Obtaining the deployment token may include receiving the deployment token in response to the token request.

In one example, the system may include metadata pertaining to the artifact in the token request. The metadata pertaining to the artifact may be utilized to verify that the set of one or more customer designated conditions are satisfied. Additionally, or alternatively, the metadata may be utilized to generate the deployment token. In one example, obtaining the deployment token may include obtaining from the deployment request, metadata pertaining to the artifact, and including the metadata pertaining to the artifact in the token request. Upon receiving the token request, the system may verify that the set of one or more customer designated conditions are satisfied, and in response to verifying that the set of one or more customer designated conditions are satisfied, the system obtains the deployment token.

Upon having obtained the deployment token, the system determines whether the deployment token valid. (Operation 1326). In one example, the deployment service includes a verification service and the verification service includes a deployment token validation submodule that validates the deployment token. Additionally, or alternatively, the system may include a verification service that interacts with the deployment service, and the deployment service may direct the deployment token to the verification service for validation. The verification service may validate the deployment token and provide an indication to the deployment service that the deployment token was successfully validated.

Upon successfully obtaining validation of the deployment token, the system directs the deployment request and/or the artifact to a destination address in the target computing environment (Operation 1328). In one example, a resource in the target computing environment receives the deployment request and validates the deployment token included in the deployment request. In response to successfully validating the deployment token, the resource deploys the artifact in the target computing environment. The resource may receive the artifact for deployment with the deployment request and/or the resource may retrieve the artifact from a location indicated by the deployment request.

Referring again to operation 1322 and operation 1328, when the system determines that deployment of an artifact is not conditioned on obtaining a deployment token, the system directs the deployment request and/or the artifact to a destination address in the target computing environment for deployment.

Referring again to operation 1326, when the system determines that a deployment token is not valid, the system may obtain a new deployment token (operation 1324). In one example, the system may generate a notification indicating the deployment token is not valid. The system may obtain a new deployment token (operation 1324) in response to the notification.

In one example, the system may determine, when obtaining a deployment token (operation 1326), that the set of one or more customer designated conditions are unsatisfied. In response to determining that the set of one or more customer designated conditions are unsatisfied, the system refrains from directing the artifact to the target computing environment. In one example, in response to determining that the set of one or more customer designated conditions are unsatisfied, the system generates a non-validation response indicating that the set of one or more customer designated conditions are unsatisfied. The system may direct the non-validation response to the artifact deployment tool. Subsequent to directing the non-validation response to the artifact deployment tool, the system may receive another deployment request to deploy the artifact to the target computing environment (Operation 1320). The system may obtain a deployment token in response to a subsequent attempt to obtain a verification token and/or to verify that the set of one or more customer designated conditions are satisfied (Operation 1324). The system may obtain validation of the deployment token (Operation 1326), and responsive to successfully obtaining validation of the second deployment token, the system may direct the artifact to the destination address in the target computing environment (Operation 1328). The artifact is received at the destination address and deployed in the target computing environment.

In one example, subsequent to determining that deployment of the artifact is conditioned on obtaining a deployment token (Operation 1322), the system initiates a process for verifying that the set of one or more customer designated conditions are satisfied. The process may include queuing the deployment request while awaiting the deployment token (Operation 1324). When the system receives the deployment token, the system resumes the process. Subsequent to receiving the deployment token, the process includes obtaining validation of the deployment token (Operation 1326) and directing the deployment request and/or the artifact to the destination address in the target computing environment (Operation 1328).

5. Example Embodiments

Referring to FIGS. 14-14C, FIGS. 15A-15C, FIGS. 16A-16C, and FIGS. 17A-17C, example features and operations of systems for deploying artifacts to a cloud environment are further described in accordance with one or more embodiments. The embodiments described with reference to FIG.

Figure 14A:
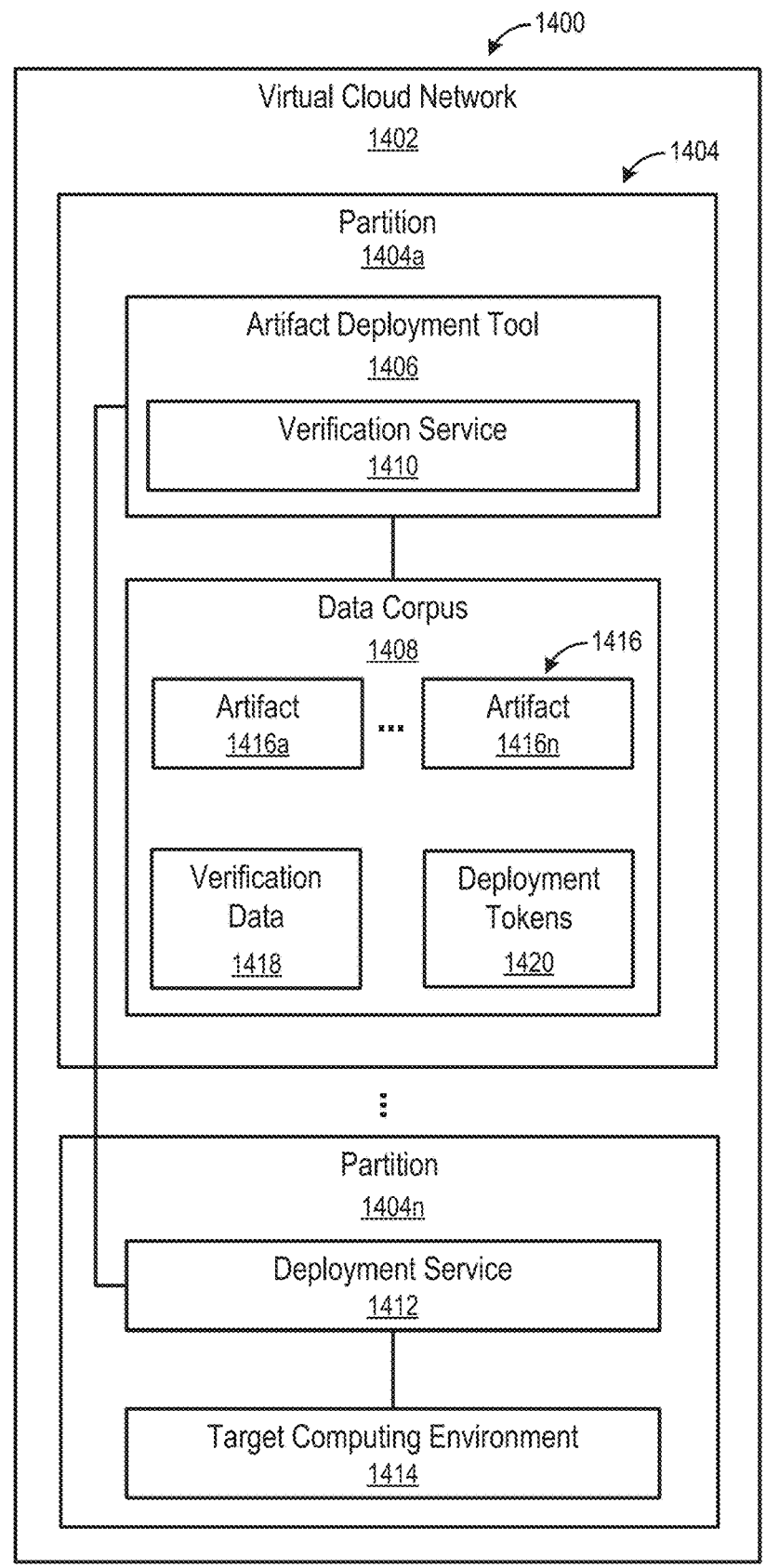
FIG. 14A illustrates an example system that includes a verification service incorporated into a deployment verification tool for deploying artifacts to a target computing environment.
Figure 15A:
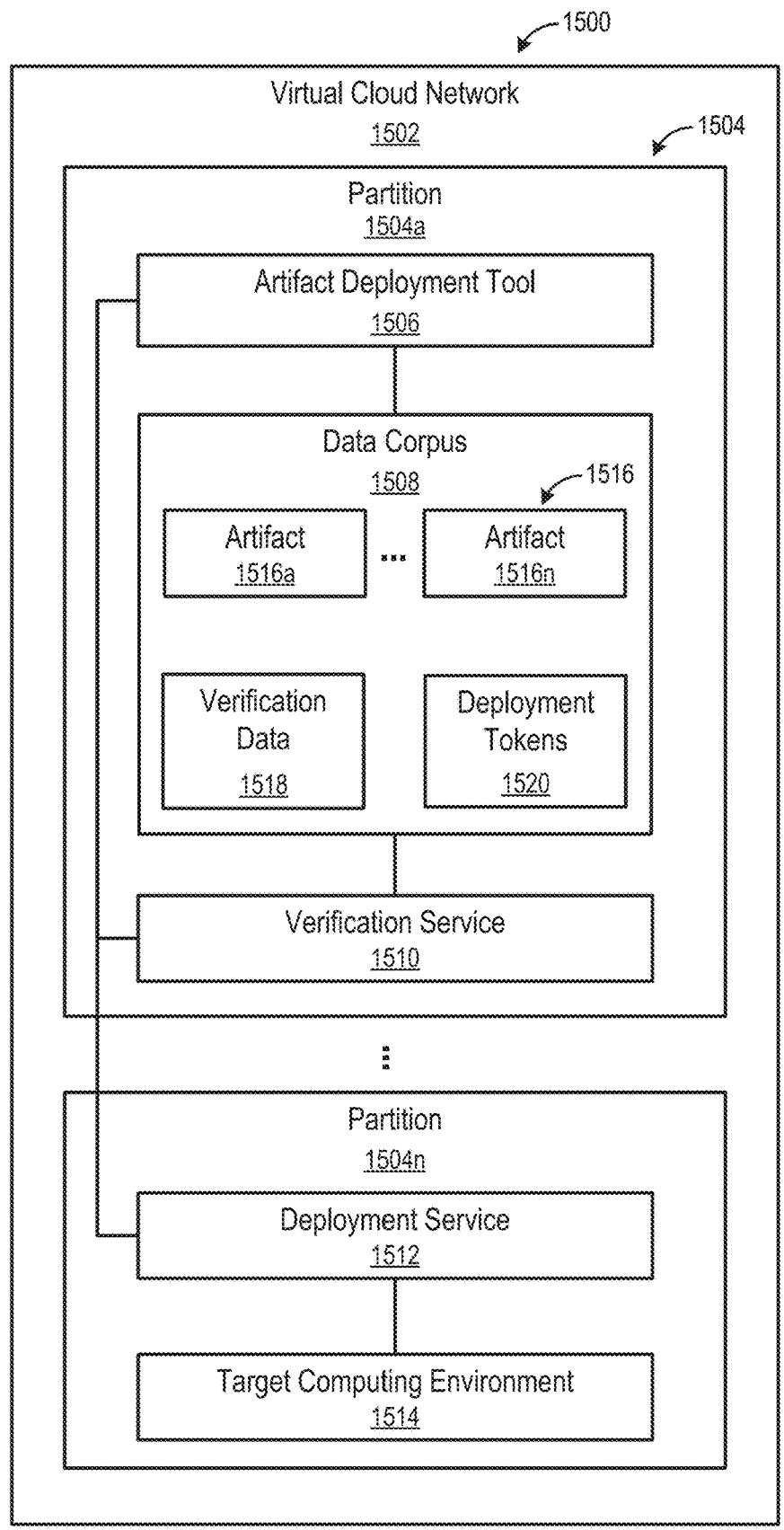
FIG. 15A illustrates an example system that includes a verification service that interacts with a deployment verification tool for deploying artifacts to a target computing environment.
Figure 16A:
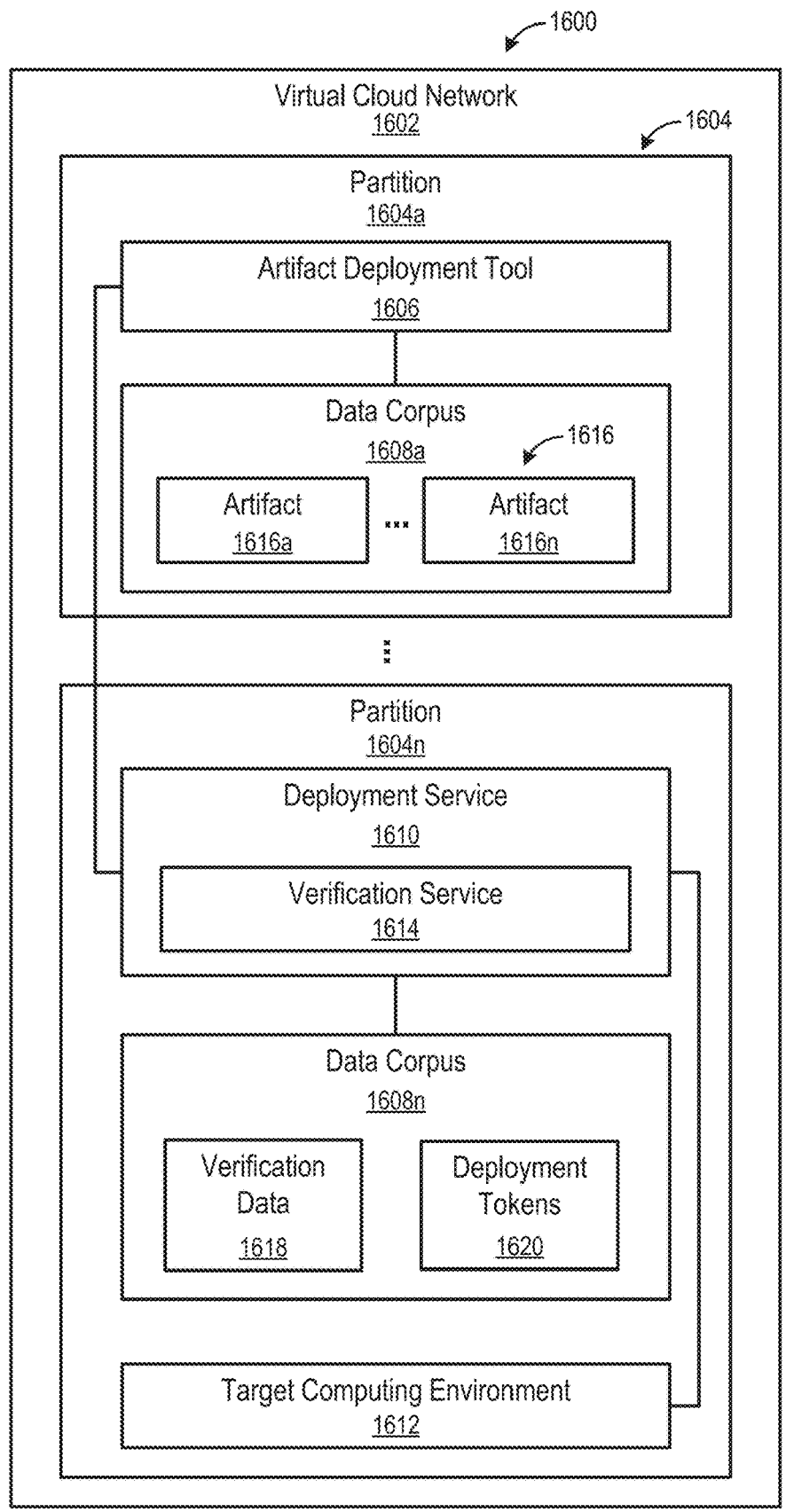
FIG. 16A illustrates an example system that includes a verification service incorporated into a deployment service for deploying artifacts to a target computing environment.
Figure 17A:
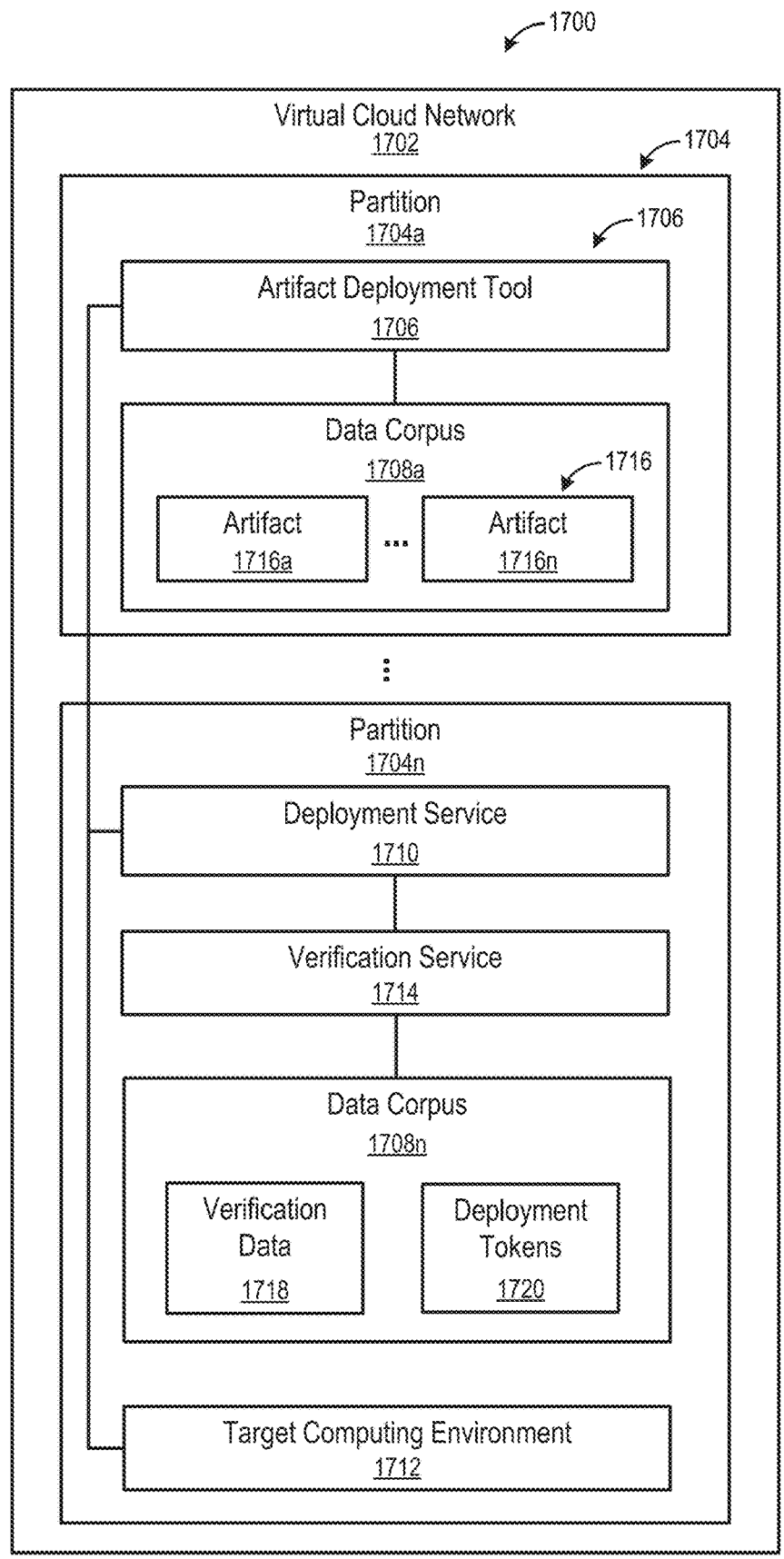
FIG. 17A illustrates an example system that includes a verification service that interacts with a deployment service for deploying artifacts to a target computing environment.

14A, FIG. 15A, FIG. 16A, and FIG. 17A include features for verifying conditions for deploying artifacts to a target computing environment and features for obtaining verification tokens representing verification that the conditions for deploying artifacts to the target computing environment are satisfied. The embodiments described with reference to FIG. 14A, FIG. 15A, FIG. 16A, and FIG. 17A may include one or more features described with reference to FIGS. 11A and 11B.

The embodiments described with reference to FIGS. 14B and 14C, FIGS. 15B and 15C, FIGS. 16B and 16C, and FIGS. 17B and 17C include operations pertaining to verifying conditions for deploying artifacts to a target computing environment and operations pertaining to verification tokens representing verification that the conditions for deploying artifacts to the target computing environment are satisfied. The embodiments with reference to FIGS. 14B and 14C, FIGS. 15B and 15C, FIGS. 16B and 16C, and FIGS. 17B and 17C may include one or more operations described with reference to FIGS. 13A and 13B.

A. Deployment Verification Tool Includes Verification Service i. Example System Components Referring to FIG. 14A, a system 1400 for deploying artifacts to a target computing environment is further described in accordance with one or more embodiments. As shown in FIG. 14A, the system 1400 includes a verification service incorporated into a deployment verification tool for deploying artifacts to a target computing environment. In one or more embodiments, the system 1400 may include more or fewer components than the components described with reference to FIG. 14A. The components described with reference to FIG. 14A may be local to or remote from each other. The components described with reference to FIG. 14A may be implemented in software and/or hardware. The components of system 1400 may be distributed over multiple applications and/or machines. Multiple components may be combined into one application and/or machine. Operations described with respect to one component may instead be performed by another component.

As shown in FIG. 14A, a system 1400 includes a virtual cloud network 1402 with a set of partitions 1404 deployed in the virtual cloud network 1402. Partition 1404a may be allocated to a cloud infrastructure provider. Partition 1404n may be allocated to a PLC operator or customer. Partition 1404a includes an artifact deployment tool 1406 and a data corpus 1408. The artifact deployment tools 1406 includes a verification service 1410. Partition 1404n includes a deployment service 1412 and at least one target computing environment 1414. The data corpus 1408 may include one or more artifacts 1416, such as artifact 1416a and artifact 1416n. Additionally, or alternatively, the data corpus 1408 may include verification data 1418. The verification data 1418 may indicate whether customer designated conditions for deploying artifacts 1416 to a target computing environment 1414 are satisfied. Additionally, or alternatively, the data corpus 1408 may include one or more deployment tokens 1420 representing verification that the customer designated conditions are satisfied.

ii. Example Operations

Figure 14B:
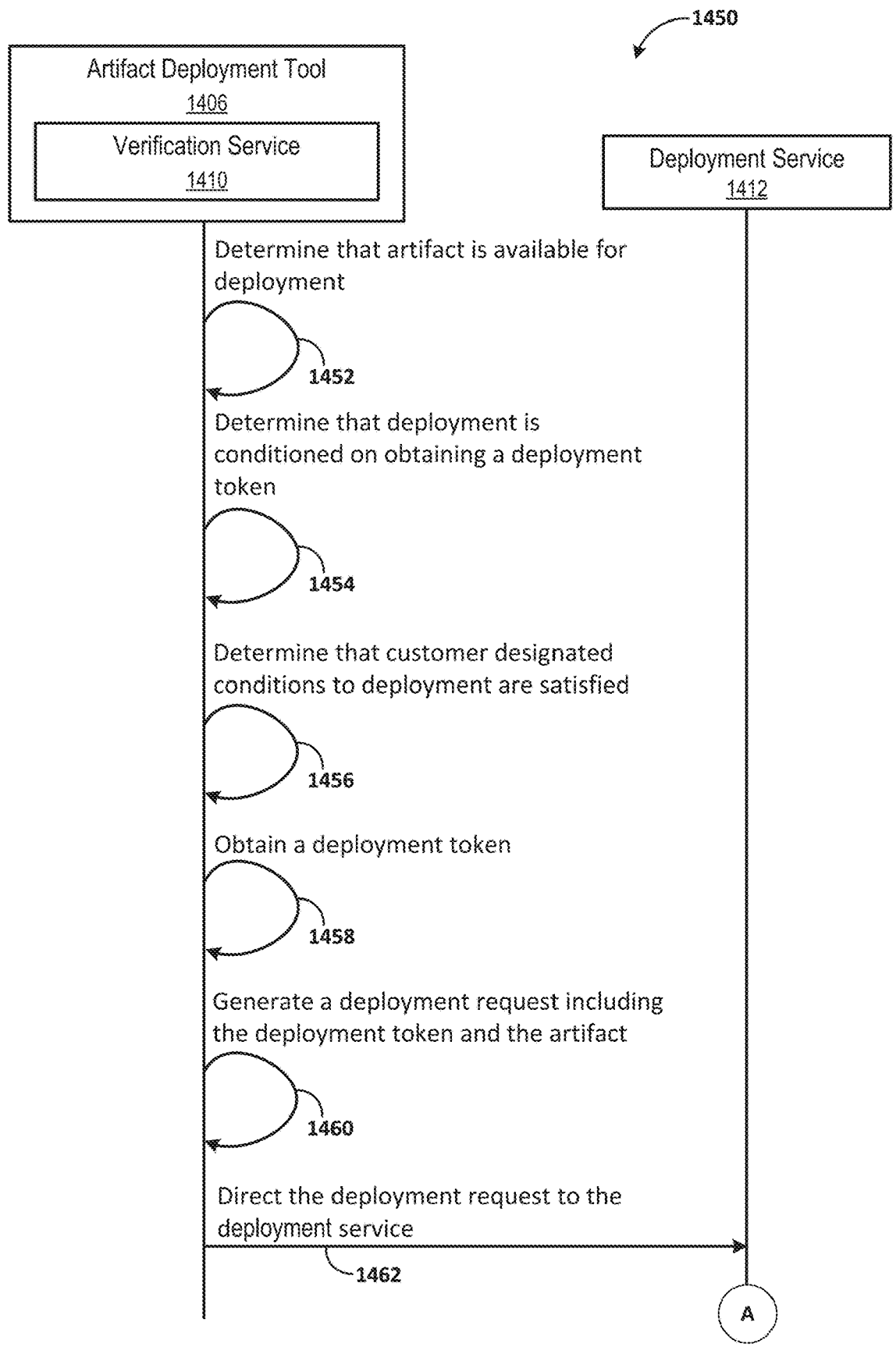
FIGS. 14B and 14C illustrate example operations of the system of FIG. 14A.
Figure 14C:
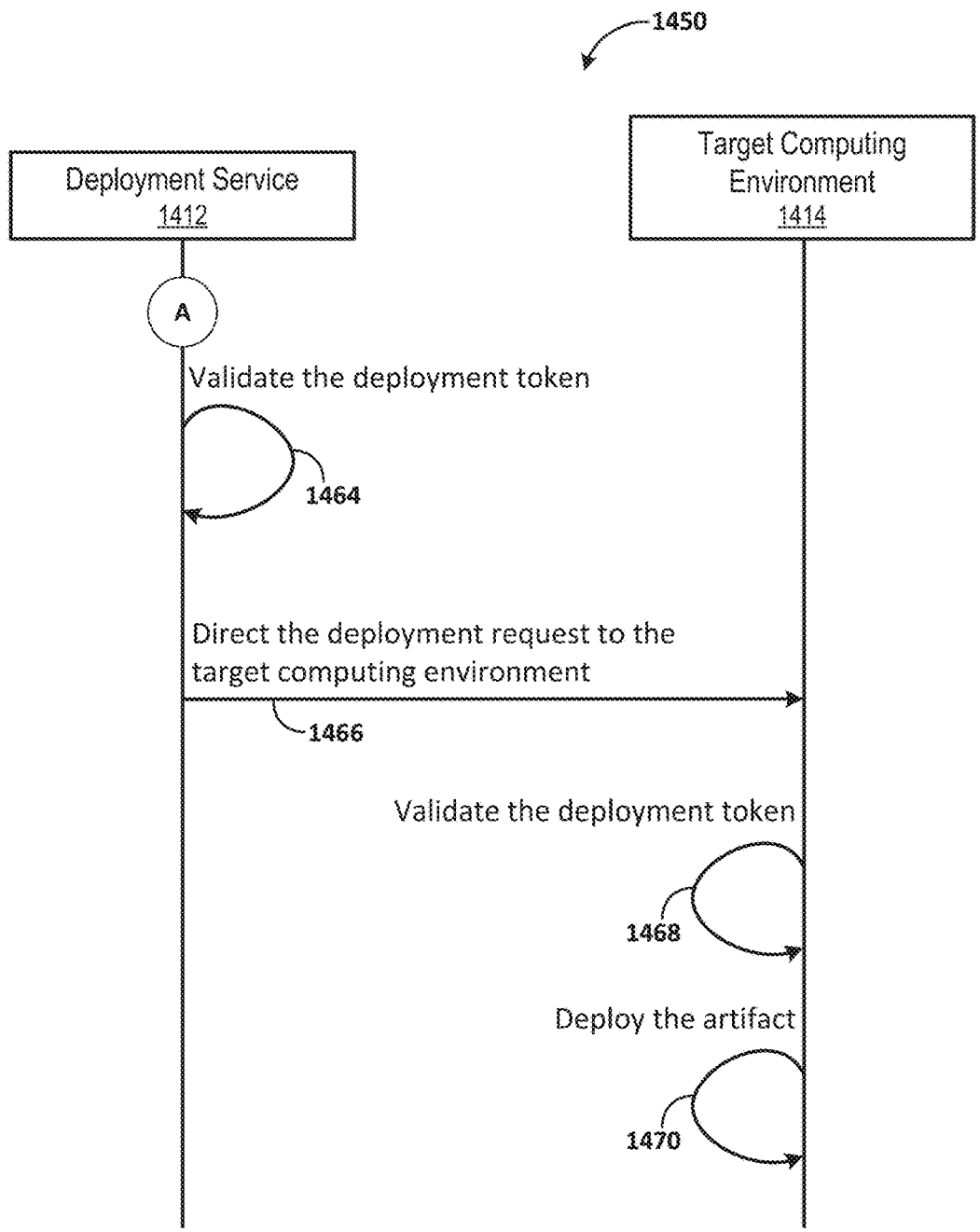

Referring to FIGS. 14B and 14C, example operations 1450 for deploying artifacts to a cloud environment are further described in accordance with one or more embodiments. One or more operations 1450 described with reference to 14B and 14C may be modified, combined, rearranged, or omitted. Accordingly, the particular sequence of operations 1450 described with reference to 14B and 14C should not be construed as limiting the scope of one or more embodiments. In one example, the operations 1450 may be performed by the one or more components of the system described with reference to FIG. 14A.

As shown in FIG. 14B, the artifact deployment tool 1406 determines that an artifact is available for deployment to the target computing environment 1414 (Operation 1452). The verification service 1410 incorporated into the artifact deployment tool 1406 determines that deployment of the artifact is conditioned on obtaining a deployment token (Operation 1454). In response to determining the deployment of the artifact is conditioned on obtaining a deployment token, the verification service 1410 determines that the customer designated conditions are satisfied (Operation 1456). In response to determining that the customer designated conditions are satisfied, the verification service 1410 obtains a deployment token (Operation 1458). The verification service 1410 may obtain the deployment token from an IAM service and/or the verification service 1410 may issue the deployment token. Upon having obtained the deployment token, the artifact deployment tool 1406 generates a deployment request to deploy the artifact to the target computing environment 1414 (Operation 1460). The deployment request may include the deployment token and the artifact. The artifact deployment tool 1406 directs the deployment request including, for example, the deployment token and the artifact, to the deployment service 1412 (Operation 1462).

Referring to FIG. 14C, the deployment service 1412 validates the deployment token corresponding to the deployment request and/or the artifact for deployment to the target computing environment 1414 (Operation 1464). In response to successfully validating the deployment token, the deployment service 1412 directs the deployment request including, for example, the deployment token and the artifact, to the target computing environment 1414 (Operation 1466). The target computing environment 1414 validates the deployment token corresponding to the deployment request and/or the artifact (Operation 1468). In response to successfully validating the deployment token, the target computing environment 1414 deploys the artifact (Operation 1470).

B. Deployment Verification Tool Interacts with Verification Service i. Example System Components Referring to FIG. 15A, a system 1500 for deploying artifacts to a target computing environment is further described in accordance with one or more embodiments. As shown in FIG. 15A, the system 1500 includes a deployment verification tool that interacts with a verification service for deploying artifacts to a target computing environment. In one or more embodiments, the system 1500 may include more or fewer components than the components described with reference to FIG. 15A. The components described with reference to FIG. 15A may be local to or remote from each other. The components described with reference to FIG. 15A may be implemented in software and/or hardware. The components of system 1500 may be distributed over multiple applications and/or machines. Multiple components may be combined into one application and/or machine. Operations described with respect to one component may instead be performed by another component.

As shown in FIG. 15A, a system 1500 includes a virtual cloud network 1502 with a set of partitions 1504 deployed in the virtual cloud network 1502. Partition 1504a may be allocated to a cloud infrastructure provider. Partition 1504n may be allocated to a PLC operator or customer. Partition 1504a includes an artifact deployment tool 1506, a data corpus 1508, and a verification service 1510. The artifact deployment tool 1506 and the verification service 1510 may be separate services deployed in partition 1504a. Partition 1504n includes a deployment service 1512 and at least one target computing environment 1514. The data corpus 1508 may include one or more artifacts 1516, such as artifact 1516a and artifact 1516n. Additionally, or alternatively, the data corpus 1508 may include verification data 1518. The verification data 1518 may indicate whether customer designated conditions for deploying artifacts 1516 to a target computing environment 1514 are satisfied. Additionally, or alternatively, the data corpus 1508 may include one or more deployment tokens 1520 representing verification that the customer designated conditions are satisfied.

ii. Example Operations

Figure 15B:
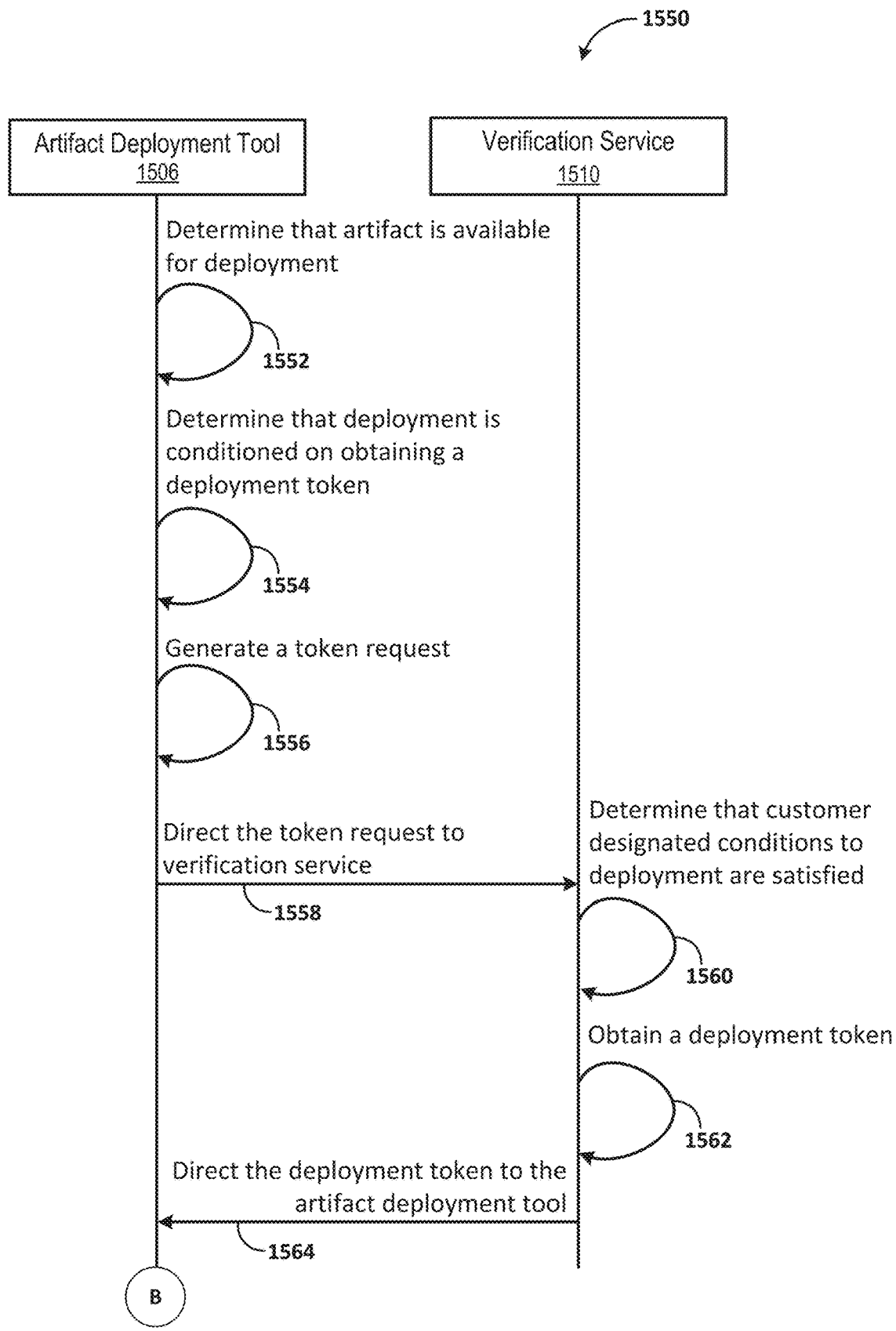
FIGS. 15B and 15C illustrate example operations of the system of FIG. 15A.
Figure 15C:
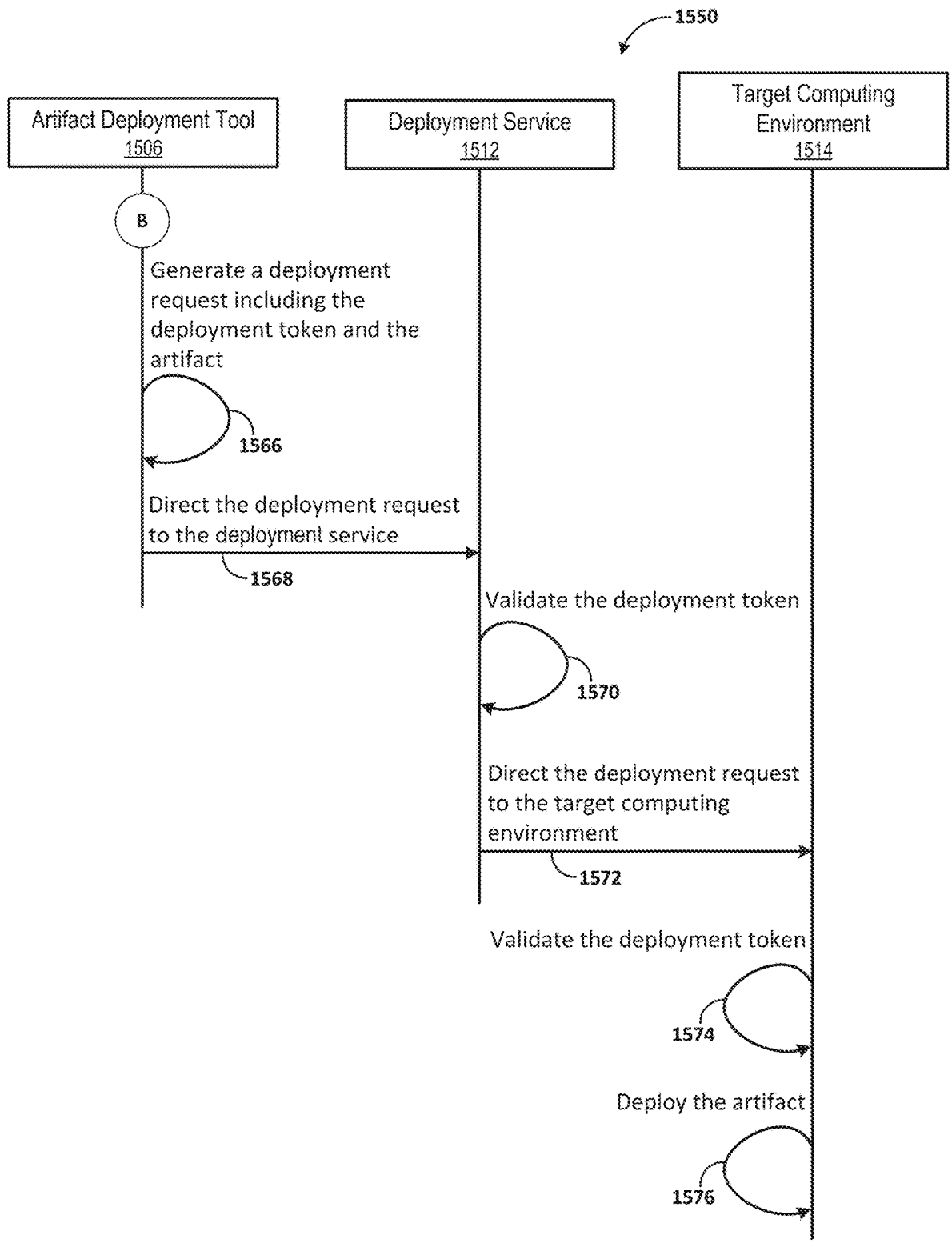

Referring to FIGS. 15B and 15C, example operations 1550 for deploying artifacts to a cloud environment are further described in accordance with one or more embodiments. One or more operations 1550 described with reference to FIGS. 15B and 15C may be modified, combined, rearranged, or omitted. Accordingly, the particular sequence of operations 1550 described with reference to FIGS. 15B and 15C should not be construed as limiting the scope of one or more embodiments. In one example, the operations 1550 may be performed by the one or more components of the system described with reference to FIG. 15A.

As shown in FIG. 15B, the artifact deployment tool 1506 determines that an artifact is available for deployment to the target computing environment 1514 (Operation 1552). The artifact deployment tool 1506 determines that deployment of the artifact is conditioned on obtaining a deployment token (Operation 1554). In response to determining the deployment of the artifact is conditioned on obtaining a deployment token, the artifact deployment tool 1506 generates a token request (Operation 1556). The token request includes metadata associated with the artifact to be deployed to the target computing environment 1514. The artifact deployment tool 1506 directs the token request to the verification service 1510 (Operation 1558).

The verification service 1510 determines that the customer designated conditions are satisfied (Operation 1560). The verification service 1510 may determine that the customer designated conditions are satisfied based at least in part on the metadata included in the token request and/or based at least in part on verification data stored in a data corpus. In one example, the verification service 1510 identifies the customer designated conditions in the data corpus based on the metadata included in the deployment token. Upon identifying the customer designated conditions, the verification service 1510 determines that the customer designated conditions are satisfied. In response to determining that the customer designated conditions are satisfied, the verification service 1510 obtains a deployment token (Operation 1562). The verification service 1510 may obtain the deployment token from an IAM service and/or the verification service 1510 may issue the deployment token. Upon having obtained the deployment token, the verification service 1510 directs the deployment token to the artifact deployment tool 1506 (Operation 1564).

Referring to FIG. 15C, the artifact deployment tool 1506 generates a deployment request to deploy the artifact to the target computing environment 1514 (Operation 1566). The deployment request may include the deployment token and the artifact. The artifact deployment tool 1506 directs the deployment request including, for example, the deployment token and the artifact, to the deployment service 1512 (Operation 1568). The deployment service 1512 validates the deployment token corresponding to the deployment request and/or the artifact for deployment to the target computing environment 1514 (Operation 1570). In response to successfully validating the deployment token, the deployment service 1512 directs the deployment request including, for example, the deployment token and the artifact, to the target computing environment 1514 (Operation 1572). The target computing environment 1514 validates the deployment token corresponding to the deployment request and/or the artifact (Operation 1574). In response to successfully validating the deployment token, the target computing environment 1514 deploys the artifact (Operation 1576).

C. Deployment Service Includes Verification Service i. Example System Components Referring to FIG. 16A, a system 1600 for deploying artifacts to a target computing environment is further described in accordance with one or more embodiments. As shown in FIG. 16A, the system 1600 includes a verification service incorporated into a deployment service for deploying artifacts to a target computing environment. In one or more embodiments, the system 1600 may include more or fewer components than the components described with reference to FIG. 16A. The components described with reference to FIG. 16A may be local to or remote from each other. The components described with reference to FIG. 16A may be implemented in software and/or hardware. The components of system 1600 may be distributed over multiple applications and/or machines. Multiple components may be combined into one application and/or machine. Operations described with respect to one component may instead be performed by another component.

As shown in FIG. 16A, a system 1600 includes a virtual cloud network 1602 with a set of partitions 1604 deployed in the virtual cloud network 1602. Partition 1604a may be allocated to a cloud infrastructure provider. Partition 1604n may be allocated to a PLC operator or customer. Partition 1604a includes an artifact deployment tool 1606 and a data corpus 1608a. Partition 1604n includes a deployment service 1610, a data corpus 1608n, and at least one target computing environment 1612. The deployment service 1610 includes a verification service 1614. The data corpus 1608a of partition 1604a may include one or more artifacts 1616, such as artifact 1616a and artifact 1616n. The data corpus 1608n of partition 1604n may include verification data 1618. The verification data 1618 may indicate whether customer designated conditions for deploying artifacts 1616 to a target computing environment 1612 are satisfied. Additionally, or alternatively, the data corpus 1608n of partition 1604n may include one or more deployment tokens 1620 representing verification that the customer designated conditions are satisfied.

ii. Example Operations

Figure 16B:
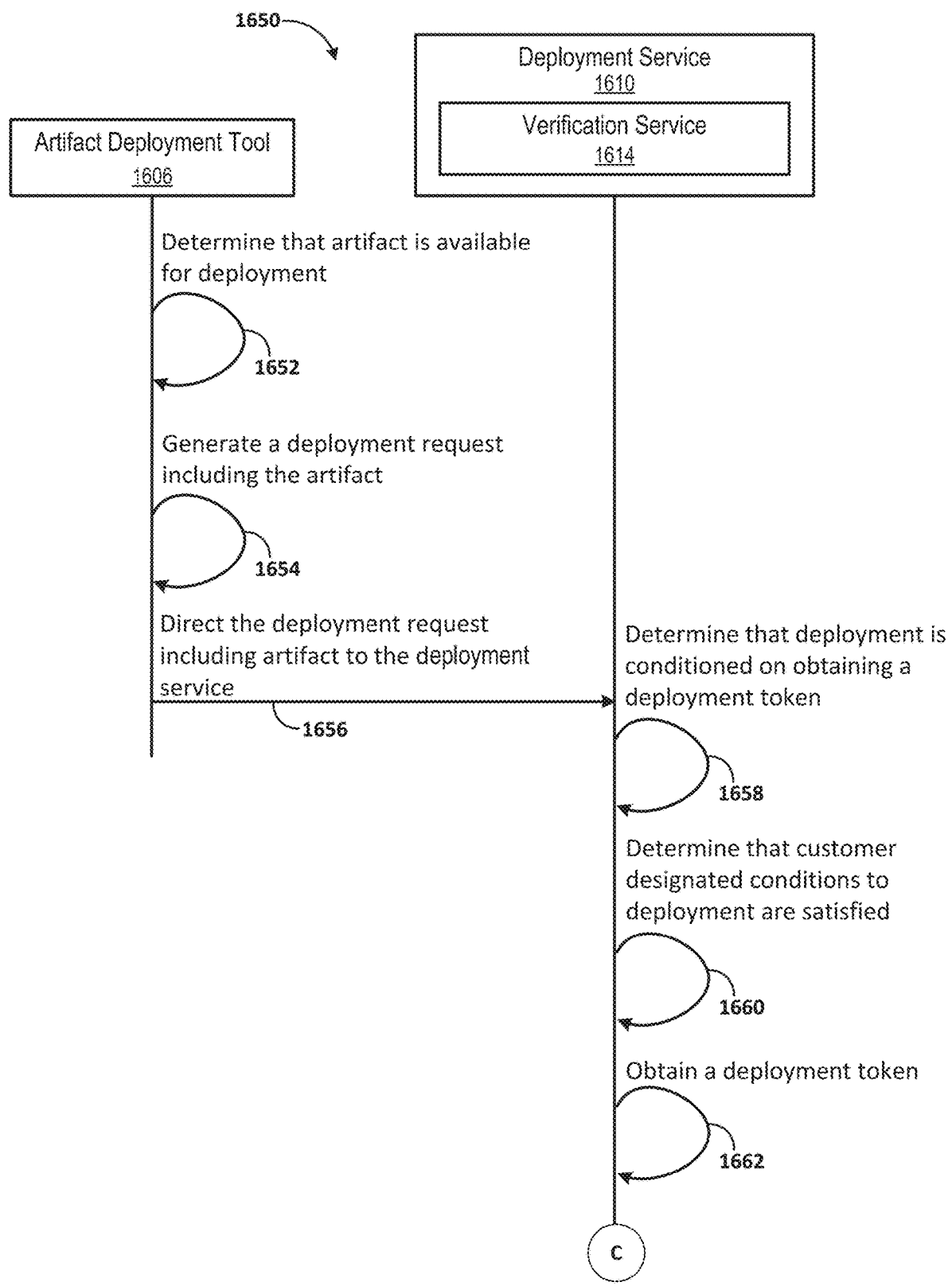
FIGS. 16B and 16C illustrate example operations of the system of FIG. 16A.
Figure 16C:
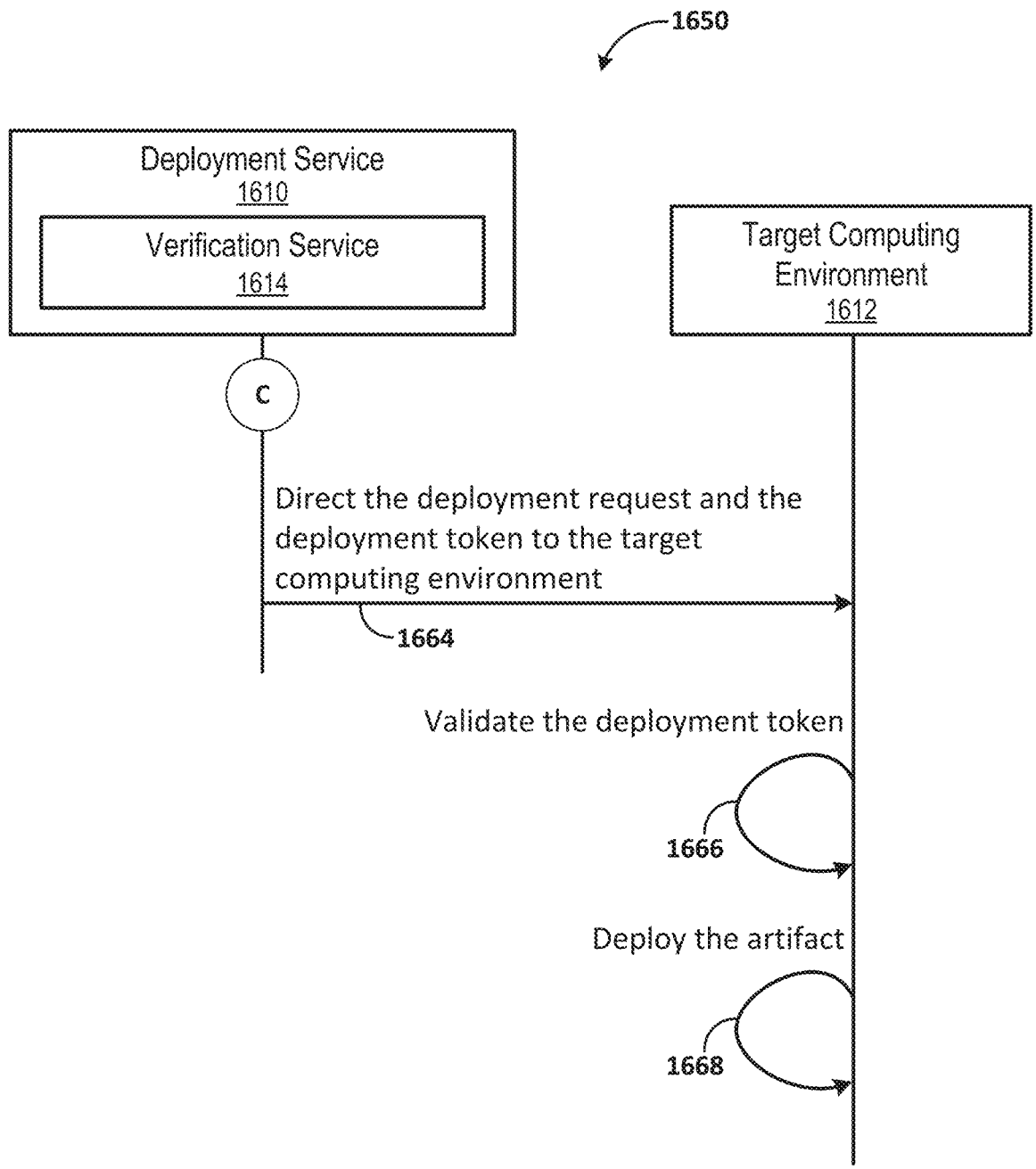

Referring to FIGS. 16B and 16C, example operations 1650 for deploying artifacts to a cloud environment are further described in accordance with one or more embodiments. One or more operations 1650 described with reference to FIGS. 16B and 16C may be modified, combined, rearranged, or omitted. Accordingly, the particular sequence of operations 1650 described with reference to FIGS. 16B and 16C should not be construed as limiting the scope of one or more embodiments. In one example, the operations 1650 may be performed by the one or more components of the system described with reference to FIG. 16A.

As shown in FIG. 16B, the artifact deployment tool 1606 determines that an artifact is available for deployment to the target computing environment 1612 (Operation 1652). The artifact deployment tool 1606 generates a deployment request to deploy the artifact to the target computing environment 1612 (Operation 1654). The deployment request may include the artifact. The artifact deployment tool 1606 directs the deployment request including, for example, the artifact, to the deployment service 1610 (Operation 1656). The verification service 1614 incorporated into the deployment service 1610 determines that deployment of the artifact is conditioned on obtaining a deployment token (Operation 1658). In response to determining the deployment of the artifact is conditioned on obtaining a deployment token, the verification service 1614 determines that the customer designated conditions are satisfied (Operation 1660). In response to determining that the customer designated conditions are satisfied, the verification service 1614 obtains a deployment token (Operation 1662). The verification service 1614 may obtain the deployment token from an IAM service and/or the verification service 1614 may issue the deployment token.

Referring to FIG. 16C, upon having obtained the deployment token, the deployment service 1610 directs the deployment request (including, for example, the artifact) and the deployment token to the to the target computing environment 1612 (Operation 1664). The target computing environment 1612 validates the deployment token corresponding to the deployment request and/or the artifact (Operation 1666). In response to successfully validating the deployment token, the target computing environment 1612 deploys the artifact (Operation 1668).

D. Deployment Service Interacts with Verification Service i. Example System Components Referring to FIG. 17A, a system 1700 for deploying artifacts to a target computing environment is further described in accordance with one or more embodiments. As shown in FIG. 17A, the system 1700 includes a deployment verification tool that interacts with a deployment service for deploying artifacts to a target computing environment. In one or more embodiments, the system 1700 may include more or fewer components than the components described with reference to FIG. 17A. The components described with reference to FIG. 17A may be local to or remote from each other. The components described with reference to FIG. 17A may be implemented in software and/or hardware. The components of system 1700 may be distributed over multiple applications and/or machines. Multiple components may be combined into one application and/or machine. Operations described with respect to one component may instead be performed by another component.

As shown in FIG. 17A, a system 1700 includes a virtual cloud network 1702 with a set of partitions 1704 deployed in the virtual cloud network 1702. Partition 1704a may be allocated to a cloud infrastructure provider. Partition 1704n may be allocated to a PLC operator or customer. Partition 1704a includes an artifact deployment tool 1706 and a data corpus 1708a. Partition 1704n includes a data corpus 1708n, a deployment service 1710, at least one target computing environment 1712, and a verification service 1714. The deployment service 1710 and the verification service 1714 may be separate services deployed in partition 1704n. The data corpus 1708a of partition 1704a may include one or more artifacts 1716, such as artifact 1716a and artifact 1716n. The data corpus 1708n of partition 1704n may include verification data 1718. The verification data 1718 may indicate whether customer designated conditions for deploying artifacts 1716 to a target computing environment 1712 are satisfied. Additionally, or alternatively, the data corpus 1708n of partition 1704n may include one or more deployment tokens 1720 representing verification that the customer designated conditions are satisfied.

ii. Example Operations

Figure 17B:
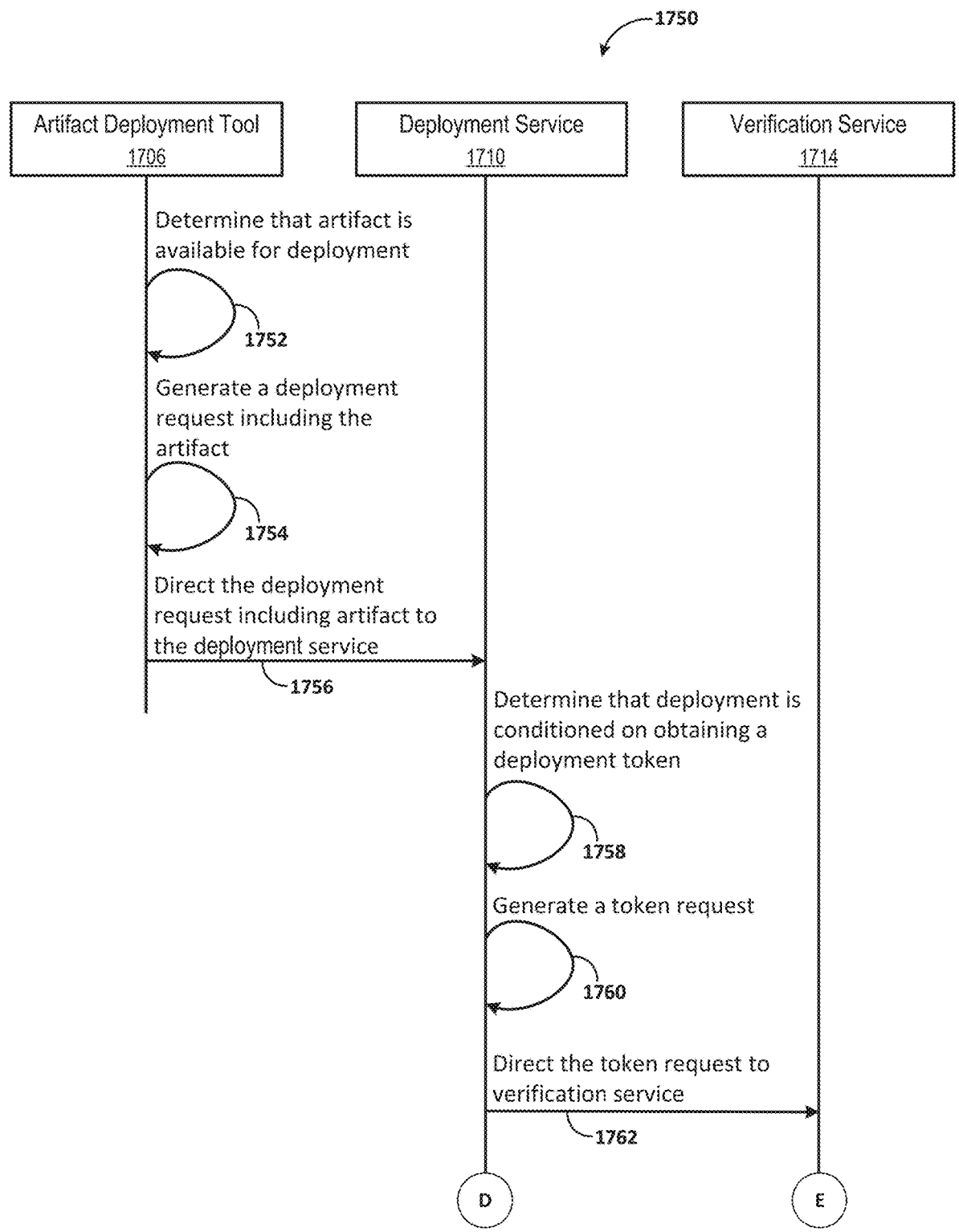
FIGS. 17B and 17C illustrate example operations of the system of FIG. 17A.
Figure 17C:
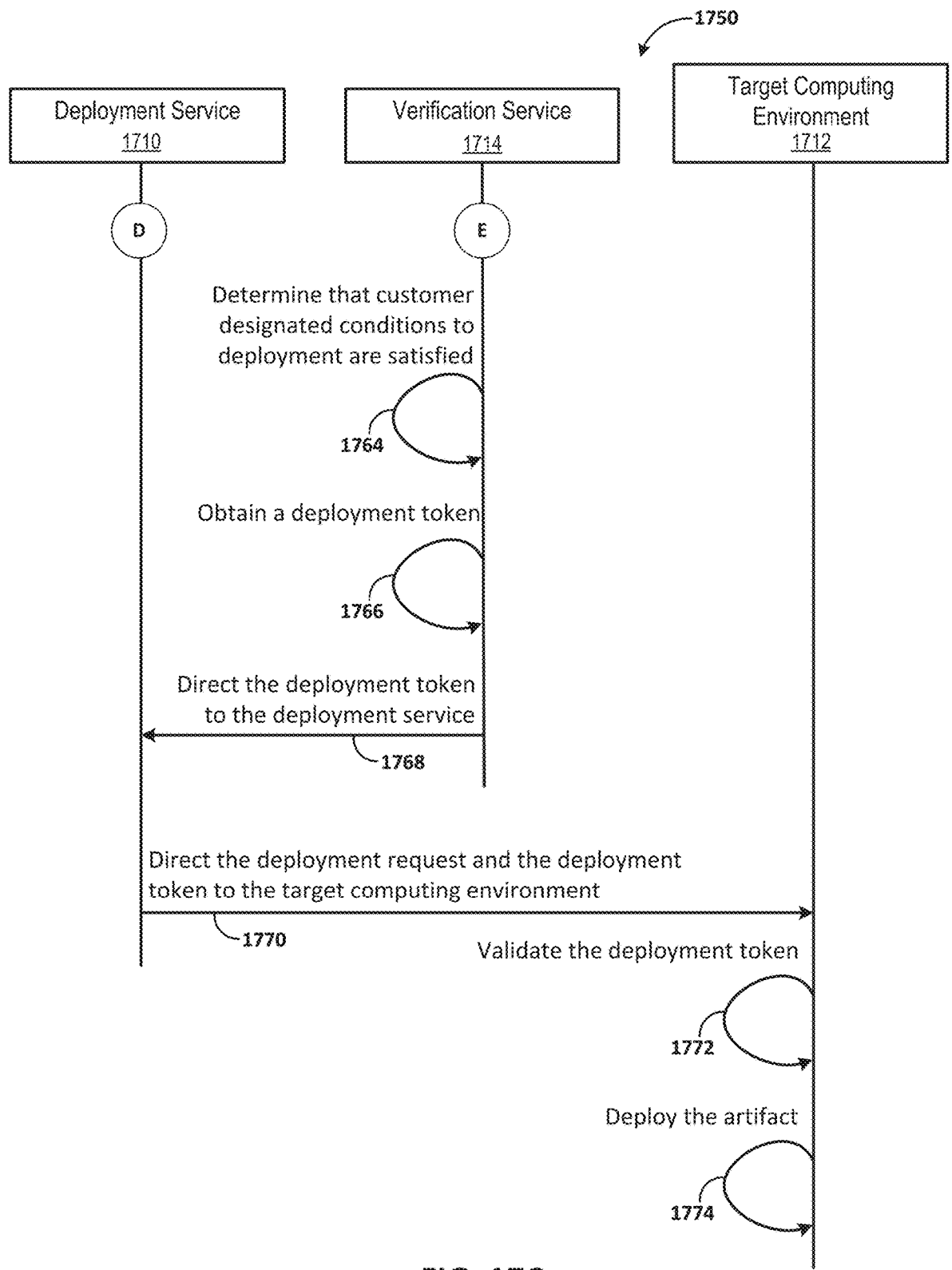

Referring to FIGS. 17B and 17C, example operations 1750 for deploying artifacts to a cloud environment are further described in accordance with one or more embodiments. One or more operations 1750 described with reference to FIGS. 17B and 17C may be modified, combined, rearranged, or omitted. Accordingly, the particular sequence of operations 1750 described with reference to FIGS. 17B and 17C should not be construed as limiting the scope of one or more embodiments. In one example, the operations 1750 may be performed by the one or more components of the system described with reference to FIG. 17A.

As shown in FIG. 17B, the artifact deployment tool 1706 determines that an artifact is available for deployment to the target computing environment 1712 (Operation 1752). The artifact deployment tool 1706 generates a deployment request to deploy the artifact to the target computing environment 1612 (Operation 1754). The deployment request may include the artifact. The artifact deployment tool 1606 directs the deployment request including, for example, the artifact, to the deployment service 1710 (Operation 1756).

The deployment service 1710 determines that deployment of the artifact is conditioned on obtaining a deployment token (Operation 1758). In response to determining the deployment of the artifact is conditioned on obtaining a deployment token, the deployment service 1710 generates a token request (Operation 1760). The token request includes metadata associated with the artifact to be deployed to the target computing environment 1712. The deployment service 1710 directs the token request to the verification service 1714 (Operation 1762).

Referring to FIG. 17C, the verification service 1714 determines that the customer designated conditions are satisfied (Operation 1764). The verification service 1714 may determine that the customer designated conditions are satisfied based at least in part on the metadata included in the token request and/or based at least in part on verification data stored in a data corpus. In one example, the verification service 1714 identifies the customer designated conditions in the data corpus based on the metadata included in the deployment token. Upon identifying the customer designated conditions, the verification service 1714 determines that the customer designated conditions are satisfied. In response to determining that the customer designated conditions are satisfied, the verification service 1714 obtains a deployment token (Operation 1766). The verification service 1714 may obtain the deployment token from an IAM service and/or the verification service 1714 may issue the deployment token. Upon having obtained the deployment token, the verification service 1714 directs the deployment token to the deployment service 1710 (Operation 1768). Upon having obtained the deployment token, the deployment service 1710 directs the deployment request (including, for example, the artifact) and the deployment token to the target computing environment 1712 (Operation 1770). The target computing environment 1712 validates the deployment token corresponding to the deployment request and/or the artifact (Operation 1772). In response to successfully validating the deployment token, the target computing environment 1712 deploys the artifact (Operation 1774).

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer-readable storage media includes instructions that, when executed by one or more hardware processors, cause performance of any of the operations described herein and/or recited in any of the claims.

In an embodiment, a method includes operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   detecting, by a deployment service for routing requests to destination addresses in a target computing environment, a first request from a first artifact deployment tool to deploy a first artifact to the target computing environment;
   obtaining, by the deployment service, a first deployment token representing verification that a first set of one or more customer designated conditions are satisfied to deploy the first artifact to the target computing environment,
      wherein deployment of the first artifact to the target computing environment is conditioned on having a valid deployment token;
   based on deployment of the first artifact to the target computing environment being conditioned on having a valid deployment token, obtaining validation, by the deployment service, of the first deployment token;
   responsive to successfully obtaining validation of the first deployment token, directing the first artifact to a first destination address in the target computing environment;
   wherein the first artifact is received at the first destination address and deployed in the target computing environment;
   wherein the method is performed by at least one device including a hardware processor.

2. The method of claim 1, further comprising:
   determining, based on a set of one or more attributes of the target computing environment, that deployment of the first artifact to the target computing environment is conditioned on having a valid deployment token;
   obtaining the first deployment token responsive to determining that deployment of the first artifact to the target computing environment is conditioned on having the valid deployment token.

3. The method of claim 1, further comprising:
   receiving, at the deployment service, a second request from a second artifact deployment tool to deploy a second artifact to a second destination address in the target computing environment;
   initiating, by the deployment service, a process for verifying that a second set of one or more customer designated conditions are satisfied to deploy the second artifact to the target computing environment;
   determining, by the deployment service, that the second set of one or more customer designated conditions are unsatisfied;
   responsive to determining that the second set of one or more customer designated conditions are unsatisfied, refraining from directing the second artifact to the second destination address in the target computing environment.

4. The method of claim 3, further comprising:
   responsive to determining that the second set of one or more customer designated conditions are unsatisfied:
   directing, to the second artifact deployment tool, a non-validation response indicating that the second set of one or more customer designated conditions are unsatisfied;
   subsequent to directing the non-validation response to the second artifact deployment tool:
      receiving, from the second artifact deployment tool, a third request to deploy the second artifact to the target computing environment;
      initiating, by the deployment service, a second attempt for verification that the second set of one or more customer designated conditions are satisfied;
      receiving a second deployment token in response to the second attempt, wherein the second deployment token represents verification that the second set of one or more customer designated conditions are satisfied;
      obtaining validation, by the deployment service, of the second deployment token;
      responsive to successfully obtaining validation of the second deployment token, directing the second artifact to the second destination address;
      wherein the second artifact is received at the second destination address and deployed in the target computing environment.

5. The method of claim 1, wherein obtaining the first deployment token comprises:
   initiating a process for verifying that the first set of one or more customer designated conditions are satisfied;
   queuing the first request while awaiting the first deployment token representing verification that the first set of one or more customer designated conditions are satisfied;
   receiving the first deployment token;
   subsequent to receiving the first deployment token, resuming the process for verifying that the first set of one or more customer designated conditions are satisfied, wherein the process further comprises:
      subsequent to resuming the process: obtaining validation of the first deployment token.

6. The method of claim 1, wherein obtaining the first deployment token comprises:

initiating a first attempt for verification that the first set of one or more customer designated conditions are satisfied;

receiving a non-validation response indicating that the first set of one or more customer designated conditions are unsatisfied;

subsequent to receiving the non-validation response, initiating a second attempt for verification that the first set of one or more customer designated conditions are satisfied;

receiving the first deployment token in response to the second attempt.

7. The method of claim 1, further comprising:

determining, by the deployment service, that the first request is directed to the first destination address in the target computing environment;

based at least on the first request being directed to the first destination address, initiating, by the deployment service, a process for verifying that the first set of one or more customer designated conditions are satisfied, wherein requests directed to the first destination address trigger the deployment service to initiate the process for verifying that the first set of one or more customer designated conditions are satisfied.

8. The method of claim 1, further comprising:

determining, by the deployment service, that the first request comprises an artifact deployment request;

based at least on the first request comprising the artifact deployment request, initiating, by the deployment service, a process for verifying that the first set of one or more customer designated conditions are satisfied, wherein artifact deployment requests trigger the deployment service to initiate the process for verifying that the first set of one or more customer designated conditions are satisfied.

9. The method of claim 1, wherein the target computing environment comprises a private label cloud environment accessible using a first set of identity resources associated with a customer and a second set of identity resources associated with a cloud infrastructure provider, wherein the deployment service is operated by a requester associated with an identity resource of the second set of identity resources.

10. The method of claim 1, wherein the first set of one or more customer designated conditions comprises:

verification that an approval to deploy the first artifact to the target computing environment, associated with an approval workflow defined by a customer, has been obtained.

11. The method of claim 1, wherein the deployment service is configured to (a) determine that an approval to deploy the first artifact to the target computing environment, associated with an approval workflow defined by a customer has been obtained, and (b) obtain the first deployment token based at least on the approval.

12. The method of claim 11, wherein (i) the deployment service generates the first deployment token, or (ii) an identity service generates the first deployment token and the deployment service obtains the first deployment token from the identity service.

13. The method of claim 1, wherein the first set of one or more customer designated conditions comprises:

verification that a set of one or more deployment states of the target computing environment designated by a customer are satisfied.

14. The method of claim 13, wherein verification that the set of one or more deployment states of the target computing environment are satisfied comprises at least one of:

verification that a deployment time for deploying the first artifact to the target computing environment is within a time window specified by at least one of: the customer, or a provider of a cloud infrastructure for the target computing environment;

verification that deployment of the first artifact to the target computing environment corresponds to a deployment sequence specified by the customer for deployments to the target computing environment; or verification that a change ticket associated with deployment of the first artifact to the target computing environment satisfies a set of one or more ticket verification criteria.

15. The method of claim 1, wherein obtaining the first deployment token comprises:

obtaining, from the first request, metadata pertaining to the first artifact;

directing, to a verification service, a token request to obtain the first deployment token, wherein the token request comprises the metadata pertaining to the first artifact;

wherein the verification service (a) receives the token request, (b) verifies, based at least in part on the metadata pertaining to the first artifact, that the first set of one or more customer designated conditions are satisfied, (c) obtains the first deployment token, and (d) provides the first deployment token to the deployment service.

16. The method of claim 15, wherein the verification service verifies at least one of:

an approval to deploy the first artifact to the target computing environment, associated with an approval workflow defined by a customer has been obtained;

a set of one or more deployment states of the target computing environment designated by the customer are satisfied; or a change ticket associated with deployment of the first artifact to the target computing environment satisfies a set of one or more ticket verification criteria.

17. The method of claim 15, wherein (a) the verification service generates the first deployment token, or (b) an identity service generates the first deployment token and the verification service obtains the first deployment token from the identity service.

18. The method of claim 1, further comprising:

receiving, at the deployment service, a second request from a second artifact deployment tool to deploy a second artifact to the target computing environment;

obtaining, by the deployment service, a second deployment token representing verification that a second set of one or more customer designated conditions are satisfied to deploy the second artifact to the target computing environment;

obtaining validation, by the deployment service, of the second deployment token;

responsive to successfully obtaining validation of the second deployment token, directing the second artifact to a second destination address in the target computing environment;

wherein the second artifact is received at the second destination address and deployed in the target computing environment;

wherein the second set of one or more customer designated conditions differs from the first set of one or more customer designated conditions.

19. One or more non-transitory computer-readable media storing instructions that, when executed by one or more hardware processors, cause performance of operations comprising:
  detecting, by a deployment service for routing requests to destination addresses in a target computing environment, a first request from a first artifact deployment tool to deploy a first artifact to the target computing environment;
  obtaining, by the deployment service, a first deployment token representing verification that a first set of one or more customer designated conditions are satisfied to deploy the first artifact to the target computing environment,
    wherein deployment of the first artifact to the target computing environment is conditioned on having a valid deployment token;
  based on deployment of the first artifact to the target computing environment being conditioned on having a valid deployment token, obtaining validation, by the deployment service, of the first deployment token;
  responsive to successfully obtaining validation of the first deployment token, directing the first artifact to a first destination address in the target computing environment;
  wherein the first artifact is received at the first destination address and deployed in the target computing environment.

20. A system comprising:
at least one device including a hardware processor;
the system being configured to perform operations comprising:
  detecting, by a deployment service for routing requests to destination addresses in a target computing environment, a first request from a first artifact deployment tool to deploy a first artifact to the target computing environment;
  obtaining, by the deployment service, a first deployment token representing verification that a first set of one or more customer designated conditions are satisfied to deploy the first artifact to the target computing environment,
    wherein deployment of the first artifact to the target computing environment is conditioned on having a valid deployment token;
  based on deployment of the first artifact to the target computing environment being conditioned on having a valid deployment token, obtaining validation, by the deployment service, of the first deployment token;
  responsive to successfully obtaining validation of the first deployment token, directing the first artifact to a first destination address in the target computing environment;
  wherein the first artifact is received at the first destination address and deployed in the target computing environment.

* * * * *